(12) United States Patent
Gareau

(10) Patent No.: US 10,225,037 B2
(45) Date of Patent: Mar. 5, 2019

(54) CHANNELIZED ODUFLEX SYSTEMS AND METHODS

(71) Applicant: Ciena Corporation, Hanover, MD (US)

(72) Inventor: Sebastien Gareau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 69 days.

(21) Appl. No.: 14/803,749

(22) Filed: Jul. 20, 2015

(65) Prior Publication Data
US 2016/0119076 A1 Apr. 28, 2016

Related U.S. Application Data

(63) Continuation-in-part of application No. 14/564,987, filed on Dec. 9, 2014.
(Continued)

(51) Int. Cl.
H04J 14/02 (2006.01)
H04Q 11/00 (2006.01)
(Continued)

(52) U.S. Cl.
CPC ...... *H04J 14/0227* (2013.01); *H04L 12/6418* (2013.01); *H04L 12/66* (2013.01); *H04Q 11/0066* (2013.01); *H04Q 2011/0086* (2013.01)

(58) Field of Classification Search
CPC .......................... H04J 14/0227; H04Q 11/0066
See application file for complete search history.

(56) References Cited

U.S. PATENT DOCUMENTS 8,718,471 B2  5/2014 Prakash et al.
2010/0040370 A1  2/2010 Aoki et al.
(Continued)

FOREIGN PATENT DOCUMENTS

CN  103795605 A  5/2014
WO  2013125621 A1  8/2013

OTHER PUBLICATIONS

Exar powering connectivity ODUflex in details "transporting any client signal in OTN" (Oct. 2011).*
(Continued)

*Primary Examiner* — Andrew W Chriss
*Assistant Examiner* — Voster Preval
(74) *Attorney, Agent, or Firm* — Clements Bernard Walker PLLC; Christopher L. Bernard; Lawrence A. Baratta, Jr.

(57) ABSTRACT

Systems and methods to provide a channelized Optical channel Data Unit flexible (ODUflex) include receiving a signal; multiplexing the signal into a Tributary Slot (TS) of the channelized ODUflex, wherein the channelized ODUflex supports a variable number of TSs and a variable size; and mapping the channelized ODUflex into an Optical channel Transport Unit k/Cn (OTUk/Cn)(k=1, 2, 3, 4), (n=1, 2, 3, . . . ). A network element configured to operate in an OTN network includes one or more ports coupled to switching circuitry, wherein a first port is configured to receive a signal, wherein the switching circuitry is configured to multiplex the signal into a TS of a channelized ODUflex, wherein the channelized ODUflex supports a variable number of TSs and a variable size (rate), and wherein a second port is configured to map the channelized ODUflex into an OTUk/Cn.

20 Claims, 19 Drawing Sheets

Related U.S. Application Data

(60) Provisional application No. 62/068,315, filed on Oct. 24, 2014.

(51) Int. Cl.
*H04L 12/64* (2006.01)
*H04L 12/66* (2006.01)

(56) References Cited

U.S. PATENT DOCUMENTS

| | | | |
|---|---|---|---|
| 2010/0158518 A1* | 6/2010 | Shin | H04J 3/0605 398/45 |
| 2012/0002965 A1* | 1/2012 | Bellato | H04J 3/1652 398/52 |
| 2013/0084066 A1 | 4/2013 | Cortez et al. | |
| 2013/0308943 A1 | 11/2013 | Young et al. | |
| 2014/0093235 A1 | 4/2014 | Gareau et al. | |
| 2015/0139650 A1* | 5/2015 | Su | H04B 10/27 398/66 |
| 2015/0244464 A1* | 8/2015 | Maggiari | H04J 3/1652 398/68 |
| 2015/0295840 A1* | 10/2015 | Loehr | H04J 3/1652 398/68 |
| 2015/0358431 A1* | 12/2015 | Loprieno | H04L 69/04 398/45 |
| 2016/0050044 A1* | 2/2016 | Liu | H04J 14/086 14/86 |

OTHER PUBLICATIONS

Winterling, Peter, "100 Gigabit Ethernet-Fundamentals, Trends, and Measurement Requirements," White Paper, JDSU, pp. 1-10.
Zhao et al., "The Prospect of Inter-Data-Center Optical Networks," Optical Technologies for Data Center Networks, IEEE Communications Magazine, Sep. 2013, pp. 32-38.
"Characteristics of optical transport network hierarchy equipment functional blocks," International Telecommunication Union, Oct. 2010, pp. 1-384.
Matsumoto, Craig, "Google Wants Variable-Rate Ethernet," http://www.lightreading.com/googlewantsvariablerateethernet/d/did/701991.
"Multi-link Gearbox Implementation Agreement," Optical Internetworking Forum, May 2012, pp. 1-18.
Cole, Chris, "MLG (Multi-Link Gearbox) Project Start Proposal," Optical Internetworking Forum, Jul. 8, 2011, pp. 1-13.
Irwin, Scott, "MLG 3.0 Update and Baseline Text," Optical Internetworking Forum, Jul. 28, 2014, pp. 1-13.
"Multi-link Gearbox Implementation Agreement," Optical Internetworking Forum, Apr. 2013, pp. 1-40.
"Interfaces for the optical transport network," International Telecommunication Union, Feb. 2012, pp. 1-238.
Trowbridge, Stephen, "Mapping of 100 Gbit/s Ethernet into OTN and the need for a Lane Independent PCS," Lane Independent PCS, Mar. 2007, pp. 1-27.
ITU-T Study Group 15; Ethernet services over the OTN using transport VLAN tag and optinally MAC encapsulation; IEEE 802.1; vol. 802.1, Mar. 16, 2010; pp. 1-4.

* cited by examiner

CHANNELIZED ODUFLEX SYSTEMS AND METHODS

CROSS-REFERENCE TO RELATED APPLICATIONS

The present patent/patent application is a continuation-in-part of U.S. patent application Ser. No. 14/564,987 filed on Dec. 9, 2014 and entitled "FLEXIBLE ETHERNET AND MULTI LINK GEARBOX MAPPING PROCEDURE TO OPTICAL TRANSPORT NETWORK," which claims priority to U.S. Provisional Patent No. 62/068,315 filed on Oct. 24, 2014 entitled "FLEXIBLE ETHERNET AND MULTI LINK GEARBOX MAPPING PROCEDURE WITH OPTICAL TRANSPORT NETWORK," the contents of each are incorporated by reference herein.

FIELD OF THE DISCLOSURE

The present disclosure relates to networking systems and methods. More particularly, the present disclosure relates to channelized Optical Channel Data Unit-flexible (ODUflex) systems and methods and flexible Ethernet mapping and Multi Link Gearbox (MLG) procedure with Optical Transport Network (OTN).

BACKGROUND OF THE DISCLOSURE

OTN is defined, for example, in ITU-T Recommendations G.709/Y.1331 (February 2012) "Interfaces for the Optical Transport Network (OTN)," G.798 (December 2012) "Characteristics of optical transport network hierarchy equipment functional blocks," G.870/Y.1352 (October 2012) "Terms and definitions for optical transport networks," and the like, the contents of each are incorporated by reference. OTN is a multi-service digital wrapper that is able to support a wide range of client types. Conventionally, for multiplexing ODUk/Cn applications, the payload area of an OTN frame is divided into fixed-size Tributary Slots (TSs) with defined Payload Types (PT) of PT=0x20 for 2.5G, PT=0x21 for 1.25G, and PT=0x22 for 5G. In order to accommodate large and small clients, the sizes of the TSs were chosen as a compromise between applications and client types. However, there are large inefficiencies in mapping low rate clients into these fixed sized TSs. For example, an access/edge network element handling multiple Fast Ethernet (FE) clients and mapping them into an Optical channel Data Unit level 0 (ODU0)-sized 1.25G TS. The mapping efficiency in this example would be ~10%, where 90% of transport pipe is wasted. Another example would be mapping of 2.5 Gigabit Ethernet (GbE) into Beyond 100G (B100G) 5G TS, resulting in about a 50% mapping efficiency (note, 2.5 GbE does not fit in 2×1.25G TSs). Thus, in conventional systems and methods, there are open questions such as how to aggregate low rate signals into OTN TSs and use an OTN control plane to manage and have visibility on this aggregation. Another question, application, or problem is how to create a variable rate ODUflex tunnel, where is can be used as a multiplexed structure to provide abstraction in virtual transport applications.

Optical channel Data Unit level k (ODUk, k=0, 1, 2, 3, and 4) and Optical channel Data Unit Cn (ODUCn, C=100G, n=1, 2, . . . ) can have multiplexed structures, but these do not align 1:1 to TS sizes. However, these conventional structures are inefficient for low rate signals. As described herein, low rate signals can include any signal that would be inefficiently mapped into OTN, such as mapping a FE signal into an ODU0-ODU4, mapping a GbE into an Optical channel Transport Unit C4 (OTUC4), etc. Conventionally, low rate signals can be multiplexed into higher rates using native protocols prior to OTN. For example, an Optical Carrier-3 (OC-3, 155 Mb/s) can be multiplexed in Synchronous Optical Network (SONET) or Synchronous Digital Hierarchy (SDH), such as an Optical Carrier-48 (OC-48, 2.5G) before mapping into OTN. However, this adds an extra layer of equipment (i.e., aggregation equipment) and management (e.g., SONET/SDH control plane/network management), resulting in additional cost and complexity.

Optical channel Data Unit flexible (ODUflex) is defined in G.709 for a single client, ODUflex (Bit-synchronous Mapping Procedure (BMP)), and for packet mapping ODUflex (Generic Framing Procedure (GFP)), but does not have a multiplexed and channelized structure. For example, there is no way to map Fast Ethernet into an ODTU4.1 (Optical channel Data Tributary Unit k with ts tributary slots, where k=4 and ts=1) without wasting 90% of the TS capacity. There is also no concept of directly mapping multiples clients into a multiplexed OPUk/Cn payload area, without having to first map to a LO ODUj container and then multiplexing into HO ODUk/Cn. Again, conventionally, an FE signal is mapped to ODU0, then mapped to ODTU4.1. Another example could be supporting GbE through a flat map B100G ("Beyond" 100G, also referred to as FlexO) line. In the B100G implementations, the GbE would be mapped to ODU0 and then occupy a 5G TS into ODTUCn.1. There are no multiplexed structures for ODU0 payload and no 5G ODUk (beyond flex) to enable applications of low-rate aggregation in the edge/access Similarly, Dense Wave Division Multiplexing (DWDM) transport is expected to be the dominant cost and limiting contributor of an end-to-end link for many years to come. There is momentum in the industry to define a flexible end-to-end packet flow with a flexible Ethernet architecture to adapt to line capabilities. A consortium of companies is defining a Physical Coding Sublayer (PCS) layer Flexible Ethernet (FlexE) scheme based on a generalized approach resembling the Optical Internetworking Forum (OIF) Multi Link Gearbox (MLG) extensions utilizing granularity of PCS lanes (e.g., 5Gb/s) and Physical Medium Dependent (PMD) (e.g., 100GBASE-SR4). For example, this Flexible Ethernet MAC proposal is described by Xiaoxue Zhao et al., "The Prospect of Inter-Data-Center Optical Networks," IEEE Communications Magazine, September 2013, the contents of which are incorporated by reference herein. The FlexE scheme is also referred to as a "shim" PCS function. There are currently no defined and standard schemes for mapping this FlexE to OTN. Transport gear needs to solve this problem in an efficient manner. OIF MLG extensions are described in OIF IA # OIF-MLG-02.0 Multi-link Gearbox Implementation Agreement, April 2013, available online at www.oiforum.com/public/documents/OIF-MLG-02.0.pdf, and the contents of which are incorporated by reference herein.

Conventionally, there are two standard mapping procedures that could be applicable to FlexE, namely ODUflex Constant Bit Rate (CBR) and ODUflex Generic Framing Procedure (GFP). ODUflex(CBR) mapping requires logic to bit-demultiplex, Forward Error Correction (FEC) decode (possibly), align, reorder and deskew PCS Virtual Lanes (VLs) with knowledge of grouping and VL sizes. There could be multiple PCS/FlexE per PMD/port or vice-versa. This is a PCS layer type of mapping in transport gear and has cost/logic associated with the implementation. ODUflex (GFP) mapping requires logic to bit-demultiplex, FEC decode (possibly), align, reorder and deskew PCS VLs, then terminate the PCS coding (64B/66B) with knowledge of groupings to get to packet or MAC layer in order to perform Frame mapped GPF (GFP-F) mapping. There could be multiple FlexE per PMD/port or vice-versa. This is a Media Access Control (MAC)/packet layer type of mapping in transport gear and has significant cost/logic associated with the implementation.

BRIEF SUMMARY OF THE DISCLOSURE

In an exemplary embodiment, a method, implemented in circuitry, to provide a channelized Optical channel Data Unit flexible (ODUflex), includes receiving a signal; multiplexing the signal into a Tributary Slot (TS) of the channelized ODUflex, wherein the channelized ODUflex supports a variable number of TSs and a variable size; and mapping the channelized ODUflex into an Optical channel Transport Unit k/Cn (OTUk/Cn) (k=1, 2, 3, 4) and (n=1, 2, 3, . . . ). The mapping can include multiplexing the channelized ODUflex into an Optical channel Data Tributary Unit k/Cn with ts tributary slots, (ODTUk/Cn.ts) and mapping the ODTUk/Cn.ts into the OTUk/Cn via an Optical channel Path Unit k/Cn (OPUk/Cn) and an Optical Data Unit k/Cn (ODUk/Cn). The OTUk/Cn can have two levels of TS multiplexing with a first level of TS multiplexing into the channelized ODUflex and a second level of TS multiplexing of the channelized ODUflex into an Optical channel Data Tributary Unit k/Cn with ts tributary slots (ODTUk/Cn.ts). A size of the channelized ODUflex can be selected to match a size of one or more TSs associated with a High Order (HO) Optical channel Payload Unit level k/Cn (OPUk/Cn) (k=1, 2, 3, 4), (n=1, 2, 3, . . . ). The mapping can include mapping the channelized ODUflex to a High Order (HO) Optical channel Data Unit level k/Cn (ODUk) (k/Cn=k=1, 2, 3, 4), (n=1, 2, 3, . . . ) using fixed (synchronous) Cm/CnD parameters or a Generic Mapping Procedure asynchronous mapping. The method can further include managing the signal multiplexed into the channelized ODUflex via one or more of a management plane, a control plane, and a Software Defined Networking (SDN) controller. The signal may not efficiently map to a TS of sizes 1.25G, 2.5G, and 5G.

In another exemplary embodiment, a network element configured to operate in an Optical Transport Network (OTN) network includes one or more ports coupled to switching circuitry, wherein a first port is configured to receive a signal, wherein the switching circuitry is configured to multiplex the signal into a Tributary Slot (TS) of a channelized Optical channel Data Unit flexible (ODUflex), wherein the channelized ODUflex supports a variable number of TSs and a variable size, and wherein a second port is configured to map the channelized ODUflex into an Optical channel Transport Unit k (OTUk/Cn) (k=1, 2, 3, 4), (n=1, 2, 3, . . . ). The switching circuitry can be configured to multiplex the channelized ODUflex into an Optical channel Data Tributary Unit k/Cn with ts tributary slots, (ODTUk/Cn.ts) and mapping the ODTUk/Cn.ts into the OTUk/Cn via an Optical channel Path Unit k (OPUk/Cn) and an Optical Data Unit k/Cn (ODUk/Cn). The OTUk/Cn can have two levels of TS multiplexing with a first level of TS multiplexing into the channelized ODUflex and a second level of TS multiplexing of the channelized ODUflex into an Optical channel Data Tributary Unit k/Cn with ts tributary slots (ODTUk/Cn.ts). A size of the channelized ODUflex can be selected to match a size of one or more TSs associated with a High Order (HO) Optical channel Data Unit level k/Cn (ODUk/Cn) (k=1, 2, 3, 4), (n=1, 2, 3, . . . ). The switching circuitry can be configured to map the channelized ODUflex to a High Order (HO) Optical channel Data Unit level k (ODUk/Cn) (k=1, 2, 3, 4), (n=1, 2, 3, . . . ) using fixed (synchronous) Cm/CnD parameters or a Generic Mapping Procedure asynchronous mapping. The network element can further include a controller communicatively coupled to the plurality of ports and configured to manage the signal multiplexed into the channelized ODUflex via one or more of a management plane, a control plane, and a Software Defined Networking (SDN) controller. The signal may not efficiently map to a TS of sizes 1.25G, 2.5G, and 5G.

In a further exemplary embodiment, an Optical Transport Network (OTN) network includes a plurality of nodes interconnected to one another, wherein a channelized Optical channel Data Unit flexible (ODUflex) is configured between two nodes, wherein the channelized ODUflex supports a variable number of Tributary Slots (TSs) and a variable size, and wherein the channelized ODUflex is mapped into an Optical channel Transport Unit k/Cn (OTUk/Cn) (k=1, 2, 3, 4), (n=1, 2, 3, . . . ). The channelized ODUflex can be multiplexed into an Optical channel Data Tributary Unit k/Cn with ts tributary slots, (ODTUk/Cn.ts) and the ODTUk/Cn.ts can be mapped into the OTUk/Cn via an Optical channel Path Unit k/Cn (OPUk/Cn) and an Optical Data Unit k/Cn (ODUk/Cn). The OTUk/Cn can have two levels of TS multiplexing with a first level of TS multiplexing into the channelized ODUflex and a second level of TS multiplexing of the channelized ODUflex into an Optical channel Data Tributary Unit k/Cn with ts tributary slots (ODTUk/Cn.ts). A size of the channelized ODUflex can be selected to match a size of one or more TSs associated with a High Order (HO) Optical channel Data Unit level k/Cn (ODUk/Cn) (k=1, 2, 3, 4), (n=1, 2, 3, . . . ). The channelized ODUflex can be mapped to a High Order (HO) Optical channel Data Unit level k (ODUk/Cn) (k=1, 2, 3, 4), (n=1, 2, 3, . . . ) using fixed (synchronous) Cm/CnD parameters or a Generic Mapping Procedure asynchronous mapping. A signal multiplexed into the channelized ODUflex can be managed via one or more of a management plane, a control plane, and a Software Defined Networking (SDN) controller.

In an exemplary embodiment, a flexible mapping method, implemented in circuitry, is described to map a Physical Coding Sublayer (PCS) structure from Flexible Ethernet and/or Multi Link Gearbox (MLG) to Optical Transport Network (OTN). The flexible mapping method includes receiving one or more Virtual Lanes; and mapping each of the one or more Virtual Lanes into an associated Tributary Slot, wherein a rate and number of the Tributary Slots in OTN is set based on a rate and number of the one or more Virtual Lanes. Remote Management (RM) channels or specific Alignment Markers (AM) can be used to communicate a status of the one or more virtual lanes including use, assignment and a number of Virtual Lanes. The Tributary Slots can be in an Optical channel Payload Unit flex (OPUflex) that is mapped into an Optical channel Data Unit flex (ODUflex). The flexible mapping method can further include resizing the ODUflex responsive to a change in a number of the one or more Virtual Lanes. The flexible mapping method can further mapping the associated Tributary Slots into an Optical channel Data Unit flex (ODUflex); performing one of providing the ODUflex to an OTN switch, mapping the ODUflex into an Optical channel Transport Unit k (k=0,1,2,3,4,flex) or C=100×n (n=1, 2, 3, . . . ) (OTUk/Cn), or aggregating the ODUflex with other signals in the OTUk/Cn. The Virtual Lane can be about 5 Gb/s, and wherein a Payload Type (PT) is defined in OTN designating a Tributary Slot of about 5 Gb/s. The Virtual Lane can be about 25 Gb/s or greater, and wherein a Payload Type (PT) is defined in OTN designating a Tributary Slot of about 25 Gb/s or greater.

In another exemplary embodiment, a transport system is described configured to map a Physical Coding Sublayer (PCS) from Flexible Ethernet and/or Multi Link Gearbox (MLG) to Optical Transport Network (OTN). The transport system includes circuitry configured to receive one or more Virtual Lanes; and circuitry to map each of the one or more Virtual Lanes into an associated Tributary Slot, wherein a rate and number of the Tributary Slots in OTN is set based on a rate and number of the one or more Virtual Lanes. Remote Management (RM) channels or specific Alignment Markers (AM) can be used to communicate a status of the one or more virtual lanes including use, assignment and a number of Virtual Lanes. The Tributary Slots can be in an Optical channel Payload Unit flex (OPUflex) that is mapped into an Optical channel Data Unit flex (ODUflex). The transport system can further include circuitry configured to resize the ODUflex responsive to a change in a number of the one or more Virtual Lanes. The transport system transport system can further include circuitry configured to map the associated Tributary Slots into an Optical channel Data Unit flex (ODUflex); and circuitry configured to perform one of providing the ODUflex to an OTN switch, mapping the ODUflex into an Optical channel Transport Unit k (k=0,1,2,3,4,flex) or C=100×n (n=1, 2, 3, . . . ) (OTUk/Cn), or aggregating the ODUflex with other signals in the OTUk/Cn. The Virtual Lane can be about 5 Gb/s, and wherein a Payload Type (PT) is defined in OTN designating a Tributary Slot of about 5 Gb/s. The Virtual Lane can be about 25 Gb/s or greater, and wherein a Payload Type (PT) is defined in OTN designating a Tributary Slot of about 25 Gb/s or greater.

In a further exemplary embodiment, a flexible de-mapping method, implemented in circuitry, is described to de-map Optical Transport Network (OTN) with Tributary Slots to Virtual Lanes for Flexible Ethernet and/or Multi Link Gearbox (MLG). The flexible de-mapping method includes receiving an OTN signal with one or more Tributary Slots contained therein; and de-mapping each of the one or more Tributary Slots to output a Virtual Lane for each of the one or more Tributary Slots, wherein a rate and number of the one or more Tributary Slots in OTN is set based on a rate and number of the Virtual Lane. Remote Management (RM) channels or specific Alignment Markers (AM) are used to communicate a status of the one or more virtual lanes including use, assignment and a number of Virtual Lanes. The Tributary Slots can be in an Optical channel Payload Unit flex (OPUflex) that is mapped into an Optical channel Data Unit flex (ODUflex). The Virtual Lane can be about 5 Gb/s, and wherein a Payload Type (PT) is defined in OTN designating a Tributary Slot of about 5 Gb/s. The Virtual Lane can be about 25 Gb/s or greater, and wherein a Payload Type (PT) is defined in OTN designating a Tributary Slot of about 25 Gb/s or greater. The flexible de-mapping method can further include providing each of the Virtual Lanes to a router.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1A:
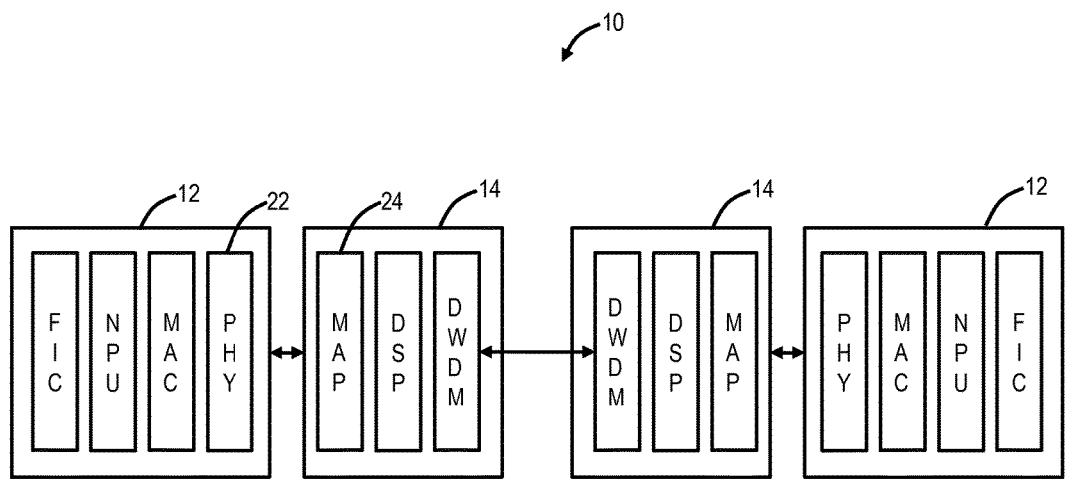
FIGS. 1A-1B are functional block diagrams of a network topology and building blocks.

In various exemplary embodiments, channelized Optical Channel Data Unit-flexible (ODUflex) systems and methods are described. Specifically, the channelized ODUflex systems and method provide a multiplexing structure in a payload of an ODUflex signal. In an exemplary embodiment, the channelized ODUflex can resemble existing PT=0x21 and PT=0x22 structures, with a variable rate and with a variable amount of tributary slots, providing full flexibility. That is, the channelized ODUflex systems and methods support a variable sized (variable rate) ODUflex with a variable amount of tributary slots (TSs). In an exemplary embodiment, the channelized ODUflex size can match a single or group of High Order (HO) ODTUCn/k.ts, and can be mapped to HO ODUCn/k using fixed (synchronous) Cm/CnD parameters (where Cm is a number of m-bit client data entities, Cn is a number of n-bit client data entities, and CnD is a difference between Cn and (m/n×Cm) or can be fully Generic Mapping Procedure (GMP) asynchronously mapped. The ODUflex multiplexed structure can be visible to OTN software, a control plane, a Software Defined Networking (SDN) controller, etc. The client(s) characteristic information can be mapped directly into the payload area of a single or multiple grouped TS belonging to this Low Order (LO) ODUflex, and a possible notation can be used such as ODUflex(MUX) or ODUflex(AGG).

In an exemplary embodiment, the channelized ODUflex systems and methods can be used to aggregate low rate signals in OTN networks and an OTN control domain. The mapping efficiency is increased and is not based on existing TS sizes. New B100G TS sizing can be optimized for larger client rates and not be burdened with application of supporting these low rate signals. Advantageously, the aggregation can be done in OTN and is visible to the control plane, SDN, etc., in comparison to aggregation using other technologies such as SDH, SONET, or packet. The channelized ODUflex systems and methods enable high fan-in applications in edge/access network elements that can efficiently map low-rate client signals, such as Fast Ethernet or E1 into OTU2. Further, these systems and methods enable private line applications in the access portions of a network. Another application of the channelized ODUflex systems and methods includes virtual transport applications where a "tunnel" is needed for traversing transport network elements (like an OTN Label Switched Path (LSP)).

In another exemplary embodiment, the channelized ODUflex systems and methods can be used for a flexible line in Single Vendor Intra-Domain Integration (SV-IaDI) applications. In various exemplary embodiments, a flexible Ethernet mapping process into OTN is described, which may be referred to as an ODUflex(MLG) (Multi Link Gearbox) or ODUflex(FlexE) mapping procedure, to support mapping into right-sized ODUflex connections. The flexible Ethernet mapping process maps the generalized MLG-style group of lanes (virtual PHYs/PMDs) into an OPUflex Tributary Slot (TS) structure, keeping PCS structures intact, and creates a single ODUflex container with a matching rate of FlexE for end-to-end flow. The ODUflex signal can be switched and multiplexed in OTN transport equipment and the like. Advantageously, the flexible Ethernet mapping process does not require alignment, reorder and deskewing of PCS lanes. This provides an efficient mechanism for equipment vendors and network operators to address the complexities with mapping FlexE shim PCS into flexible OTN containers. The flexible Ethernet mapping process can be implemented on client cards or the like, and work in conjunction with an OTN switch and/or flexible line technologies, i.e. optical modems. Advantageously, the flexible Ethernet mapping process reduces the complexity of mapping FlexE into OTN (relative to GFP-F, etc.). It allows the FlexE to be carried either by multiple fixed capacity optical links or by flexibly sized optical links. An exemplary objective of the flexible Ethernet mapping process is to efficiently couple flexible Network Processing Units (NPUs) with Next-Gen DWDM modems and to avoid PAUSE frames between router and transport equipment.

In an exemplary embodiment, the present disclosure maps/demaps Virtual Lanes (VLs) from MLG or the like directly into Tributary Slots (TSs) in ODUflex/OPUflex. This one-to-one correspondence between VLs (or PCS lanes) and TSs provides a simple and scalable mapping method in OTN for flexible traffic such as MLG, FlexE, etc. Accordingly, a Payload Type (PT) in OTN can be adjusted for specific TS rates based on the corresponding VL rates. For example, currently in MLG1.0/2.0, the VL rate is 5 Gb/s, so OTN can be adjusted with a new PT supporting 5 Gb/s. Future implementations and the like may include VL rates at 25 Gb/s or greater, and here, OTN can be updated to include a new PT supporting 25 Gb/s or greater. Accordingly, each VL is accorded its own TS in OTN and vice versa. Again, this method is simple, efficient and less complex than ODUflex(CBR) or ODUflex(GFP). This mapping procedure can be referred to as an ODUflex(MLG) or ODUflex(FlexE) mapping procedure. The mapping between VLs and TSs can use the Bit-synchronous Mapping Procedure (BMP) in OTN.

Figure 1B:
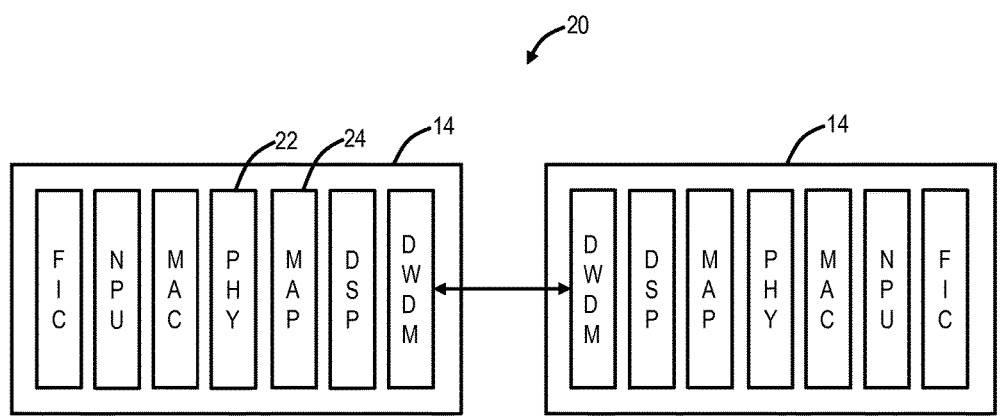

Referring to FIGS. 1A-1B, in an exemplary embodiment, functional block diagrams illustrate a network topology and building blocks. Specifically, in FIG. 1A, a topology 10 is shown for router (R) 12 to router (R) 12 interconnectivity with intermediate transport equipment (T) 14, i.e. R-T-T-R, and a topology 20 is for router (R) 12 to router (R) 12 direct interconnectivity, i.e. R-R. Functionally, the router 12 includes a Fabric Interface Chip (FIC), Network Processor (NPU), Media Access Control (MAC), and a Physical Layer Interface (PHY) 22. In FIG. 1A, the transport equipment (T) 14 includes a mapping/demapping circuitry 24, Digital Signal Processing (DSP), and a DWDM modem. In FIG. 1B, the corresponding components for the transport equipment (T) 14 are included directly in the router (R) 12, without the transport equipment (T) 14 as a separate network element.

The DWDM modem can support various different baud rates through software-programmable modulation formats. The DWDM modem can support programmable modulation, or constellations with both varying phase and/or amplitude. In an exemplary embodiment, the DWDM modem can support multiple coherent modulation formats such as, for example, i) dual-channel, dual-polarization (DP) binary phase-shift keying (BPSK) for 100G at submarine distances, ii) DP quadrature phase-shift keying (QPSK) for 100G at ultra long haul distances, iii) 16-quadrature amplitude modulation (QAM) for 200G at metro to regional (600 km) distances), or iv) dual-channel 16QAM for 400G at metro to regional distances. Thus, in this exemplary embodiment, the same DWDM modem hardware can support 100G to 400G. With associated digital signal processing (DSP) in the DWDM modem hardware, moving from one modulation format to another can be completely software-programmable. In another exemplary embodiment, the DWDM modem can support N-QAM modulation formats with and without dual-channel and dual-polarization where N can even be a real number and not necessarily an integer. Here, the DWDM modem can support non-standard speeds since N can be a real number as opposed to an integer, i.e. not just 100G, 200G, or 400G, but variable speeds, such as 130G, 270G, 560G, etc. Furthermore, with the DSP and software programming, the capacity of the DWDM modem can be adjusted upwards or downwards in a hitless manner so as to not affect the guaranteed rate. Variously, the flexible Ethernet mapping process involves mapping and demapping between the Physical Layer Interface (PHY) 22 and the mapping/demapping circuitry 24, ultimately for transmission via the DWDM modem.

Figure 2A:
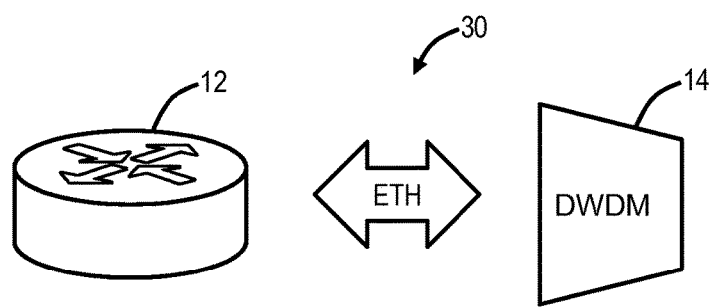
FIGS. 2A-2D are block diagrams of different options for interfacing between the router (R) and the transport equipment (T)

Referring to FIGS. 2A-2D, in various exemplary embodiments, block diagrams illustrate different options for Ethernet mapping 30, 32, 34, 36 between the router (R) 12 and the transport equipment (T) 14. Note, as described herein, the flexible Ethernet mapping between the router (R) 12 and the transport equipment (T) 14 is between the Physical Layer Interface (PHY) 22 and the mapping/demapping circuitry 24. FIG. 2A illustrates sub-rate grooming for the Ethernet mapping 30. Here, there is a partially filled standard rate PHY 22 for the router, e.g. 400GBASE-SR4 with 250G of traffic. At the mapping/demapping circuitry 24, the packet mapping is performed in a right-sized ODUflex(GFP), so only 250G is transported by the DWDM modem. However, the Ethernet mapping 30 is wasteful for the router ports and the NPU, requires higher rates for the PHY 22, requires packet mapping capabilities in the transport equipment and some buffering, etc. Also, the Ethernet mapping 30 requires flow-control or throttling such as through PAUSE frames.

Figure 2B:
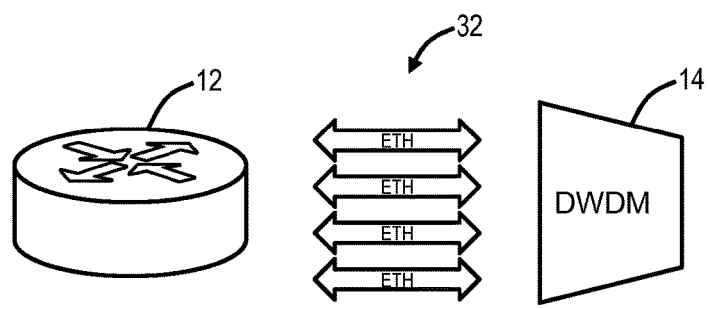

FIG. 2B illustrates super-rate bonding for the Ethernet mapping 32. This is similar to Link Aggregation Group (LAG) but performed at the PCS (flexE shim) PHYs 22. Here there are multiple standard rate PHYs 22 on the router 12 and the transport equipment 14 can perform CBR mappings to individual ODUk for each of the standard rate PHYs 22. The Ethernet mapping 32 does user smaller PHY containers (e.g. 10G, 25G, 40G, etc.), but is not dynamic and does require deskew.

Figure 2C:
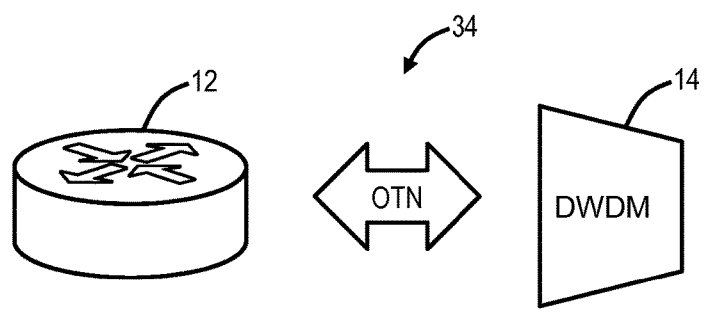

FIG. 2C illustrates an approach with OTN in the routers 12 for the Ethernet mapping 34. Here, the PHY 22 in the router is a channelized OTN router port (e.g. OTUC4) and the transport equipment 14 can directly provide the channelized OTN router port to the DWDM modem. This could use ODUflex(GFP) to replace the Ethernet PCS. However, one major drawback of this approach is that the routers 12 do not currently have channelized OTN capabilities, and requiring this capability is likely to push too much cost onto the router 12.

Figure 2D:
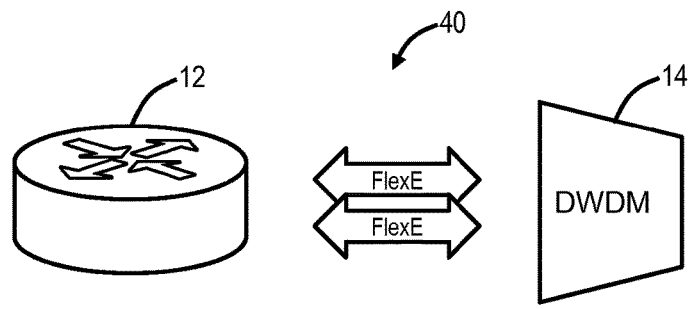

FIG. 2D illustrates an approach using a generalized MLG extension for the flexible Ethernet mapping 40. Here, the router 12 has channelized router ports for the PHY 22 (e.g., 5 Gb/s, 25 Gb/s, etc.), and they are provided to the transport equipment 14. Again, OIF MLG extensions are described in OIF IA # OIF-MLG-02.0 Multi-link Gearbox Implementation Agreement, April 2013, available online at www.oiforum.com/public/documents/OIF-MLG-02.0.pdf, and the contents of which are incorporated by reference herein. Advantageously, the routers 12 already have some MLG capabilities to create MLG channelized router ports.

FlexE is proposing a scheme where a packet flow gets mapped and distributed (i.e. MLD or calendar/scheduler style) over n standard-rate PCS, and then these can get mapped to m VL and PMDs. The interface to transport gear is typically standard rate PMDs and gray optics (i.e. 100GBASE-SR4) which is channelized.

The flexible Ethernet mapping 40 process described herein contemplates channelized router ports utilizing generalized MLG-style capabilities with standard PHY/PMD rate channels. This is channelization, sub-rate and super-rate (bonding) all in one; similar to an MLG approach.

Figure 2E:
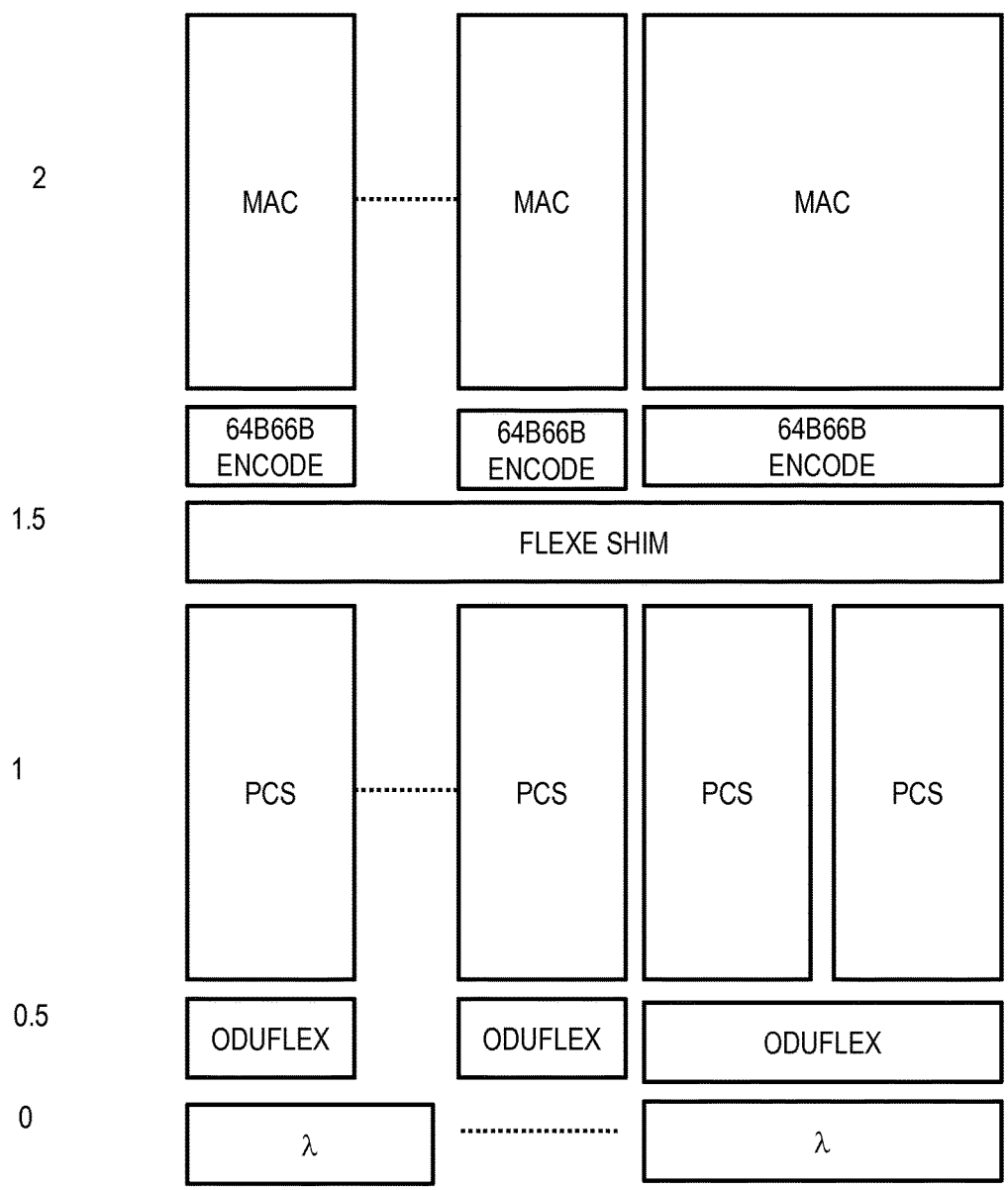
FIG. 2E is a logical diagram of Layers 2-0 of the OSI stack in reference to the flexible Ethernet shim and mapping processes described herein.

Referring to FIG. 2E, in an exemplary embodiment, a logical diagram illustrates Layers 2-0 of the OSI stack in reference to the flexible Ethernet mapping processes described herein. Here, Layer 2 traffic (MAC) is 64B/66B encoded into a FlexE Shim layer which is broken down into single or multiple PCS at layer 1, mapped to ODUflex and provided on a wavelength.

Figure 3:
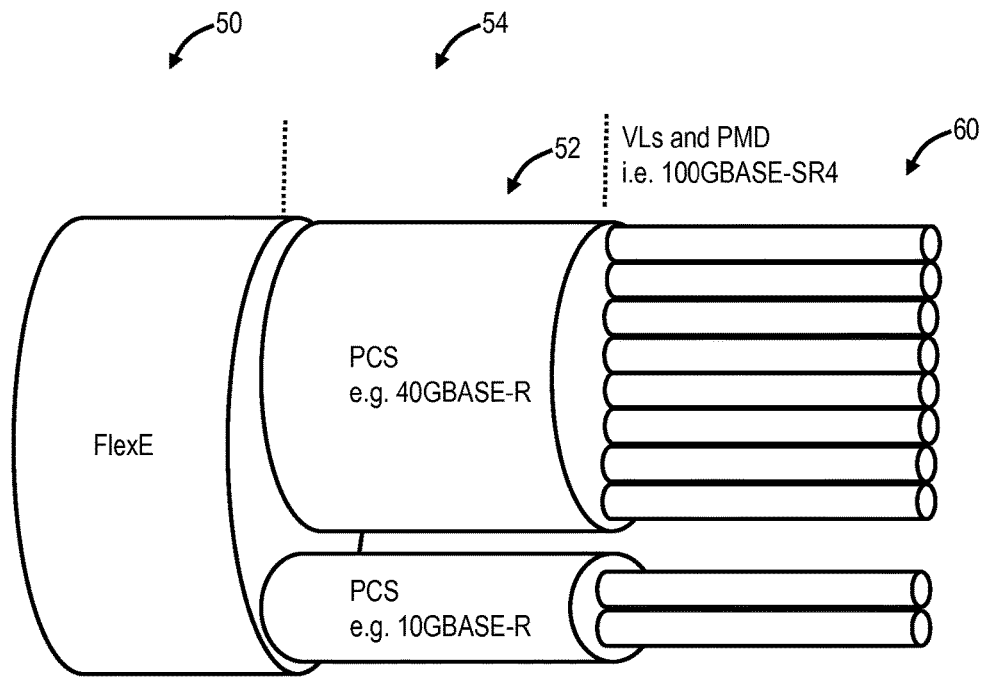
FIG. 3 is a logical diagram of a FlexE (e.g., 50 Gb/s) with generalized MLG-style capabilities.

Referring to FIG. 3, in an exemplary embodiment, a block diagram illustrates an exemplary FlexE 50 (e.g., assume 50 Gb/s for illustration purposes) with generalized MLG-style capabilities. Here, there is a scheduler (or TDM structure) or FlexE frame based distribution to PMD 52 with standard Ethernet PCS layers 52 (e.g., 10GBASE-R+40GBASE-R) to VLs and PMD (e.g., 100G-BASE-SR). For example, MLG2.0 can already stripe 40G across 2×100G PHYs, such as to support 5×40G. This can use the MLD type of scheme to distribute single packet flow across different virtual channels/PHYs, using 64b66b word boundaries and calendar-based scheduler, or FlexE fixed frame format. MLG utilizes Virtual Lanes (VLs) 60. Again, in MLG 1.0/2.0, a rate of the VLs 60 is ~5 Gb/s each. The VLs 60 can support higher rates as well, such as ~25 Gb/s. The flexible Ethernet mapping process contemplates any rate for the VLs 60.

Figure 4:
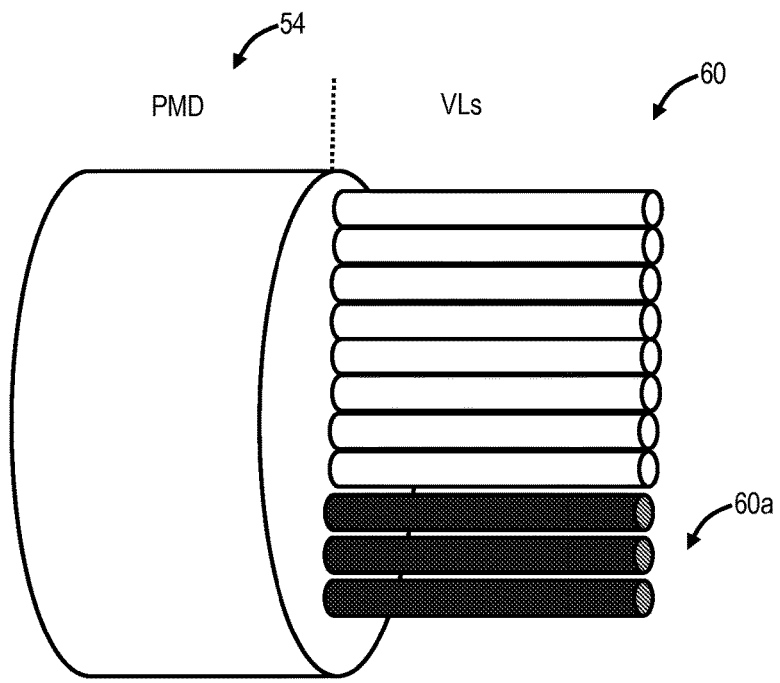
FIG. 4 is a block diagram of PMD and used/unused VL structure.

Referring to FIG. 4, in an exemplary embodiment, a block diagram illustrates PMD 54 and VL 60 interconnections. That is, the PMD 54 includes a plurality of VLs 60. MLG 3.0 proposes to extend the MLG 1.0/2.0 to support Monitor and Control, as well as define IEEE 802.3bj RS-FEC compatibility. Specifically, the Monitor and Control in MLG 3.0 will allow Remote Management (RM) channels or specific Alignment Markers (AM) to communicate a status of the VLs 60. In this manner, the status of the VLs 60 can be communicated. For example, VLs 60a may be unused or Open Connection Indication (OCI), meaning the VLs 60a are not used. The flexible Ethernet mapping process contemplates using similar MLG3.0 RMs or specific AM to indicate OCI/unused on the VLs 60, 60a which can be used to communicate transport capabilities from the transport equipment 14 to the router 12 or traffic capacity from the router 12 to the transport equipment 14.

Figure 5:
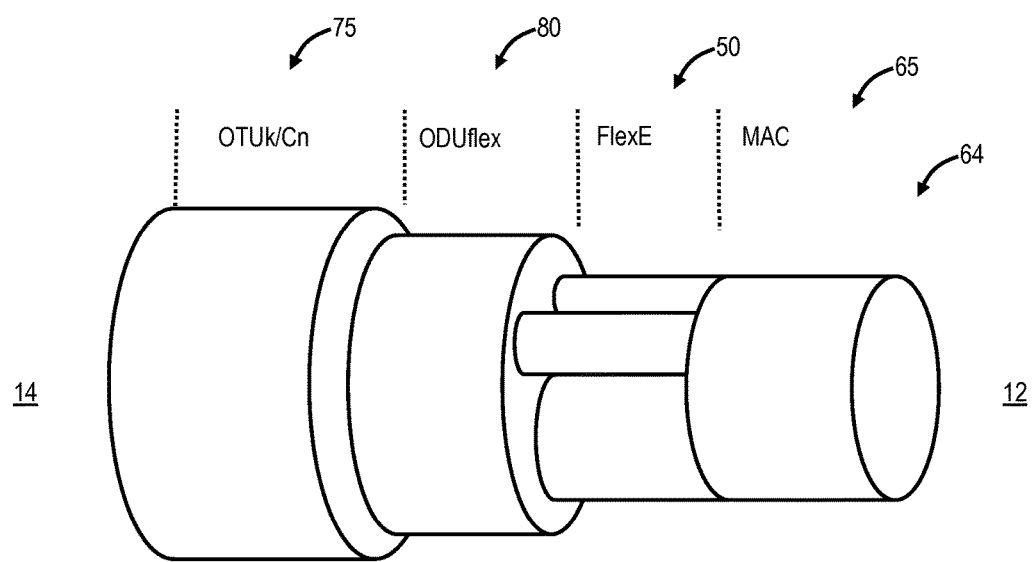
FIG. 5 is a logical diagram of a flexible Ethernet mapping process where FlexE from a router where associated VLs/PMDs are mapped together into a single ODUflex container.

Referring to FIG. 5, in an exemplary embodiment, a logical diagram illustrates a flexible Ethernet mapping process 64. The logical diagram in FIG. 5 is bidirectional between the transport equipment 14, which utilizes OTN, and the router 12, which utilizes Ethernet (packets). The flexible Ethernet mapping process 64 uses MLG on the router 12. In FIG. 5, the flexible Ethernet mapping process 64 includes MAC 65 from the router 12 with FlexE 50 where associated VLs are mapped together into a single ODUflex container 80. In an exemplary embodiment, the flexible Ethernet mapping process 64 presents a new way to map grouped virtual PHYs (the VLs 60) into a single ODUflex container where the transport gear does not add to skew between the virtual PHYs in the FlexE.

Note, in FIG. 5, the ODUflex container 80 can be mapped into an Optical channel Transport Unit k (k=0,1,2,3,4,flex) or C=100×n (n=1, 2, 3, ... ) (OTUk/Cn) 75, for transport by the modem.

In an exemplary embodiment, the flexible Ethernet mapping process 64 maps/demaps the Virtual Lanes (VLs) 60 from FlexE 50 or the like directly into Tributary Slots (TSs) in ODUflex 80. This one-to-one correspondence between VLs and TSs provides a simple and scalable mapping method in OTN for flexible traffic such as MLG, FlexE, etc. Accordingly, a Payload Type (PT) in OTN can be adjusted for specific TS rates based on the corresponding VL rates. For example, currently in MLG1.0/2.0, the VL rate is 5 Gb/s, so OTN can be adjusted with a new PT supporting 5 Gb/s. Future MLG implementations and the like may include VL rates at 25 Gb/s or beyond, and here, OTN can be updated to include a new PT supporting these greater sizes. Accordingly, each VL is accorded its own TS in OTN and vice versa. Again, this method is simple and efficient and less complex than ODUflex(CBR) or ODUflex(GFP). This mapping procedure can be referred to as an ODUflex(MLG) or ODUflex(FlexE) mapping procedure. The mapping between VLs and TSs can use the Bit-synchronous Mapping Procedure (BMP) in OTN.

Figure 6:
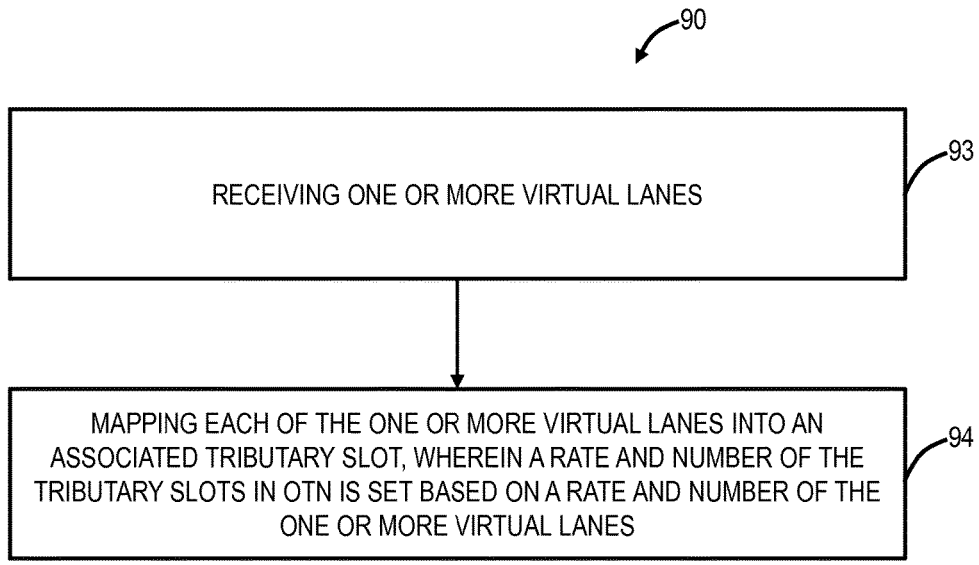
FIGS. 6 and 7 are flow charts illustrate a flexible mapping method (FIG. 6) and a flexible de-mapping method (FIG. 7) to map/de-map Virtual Lanes from Flexible Ethernet and/or Multi Link Gearbox (MLG) to/from Optical Transport Network (OTN)
Figure 7:
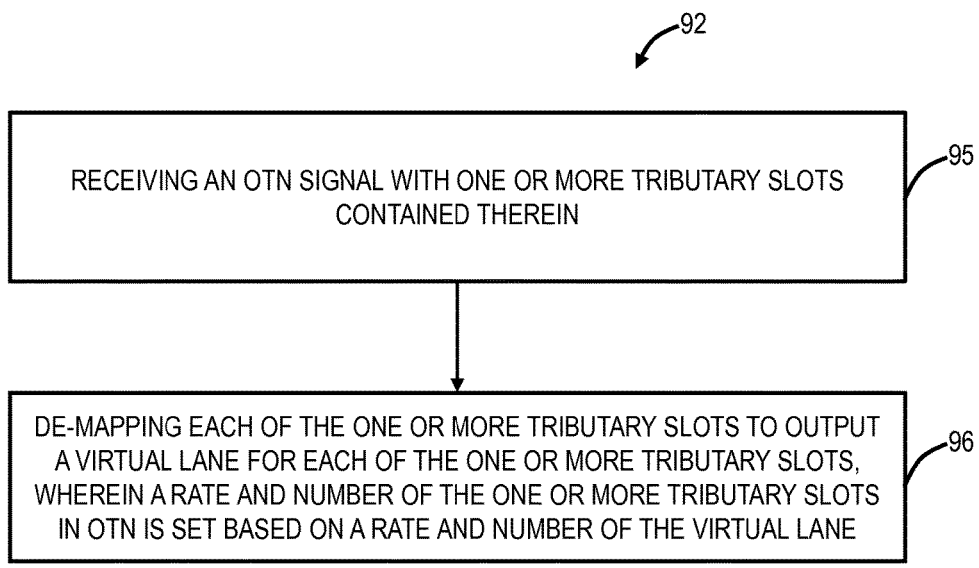

Referring to FIGS. 6 and 7, in exemplary embodiments, flow charts illustrate a flexible mapping method 90 and a flexible de-mapping method 92 to map/de-map Virtual Lanes from Flexible Ethernet and/or Multi Link Gearbox (MLG) to/from Optical Transport Network (OTN). The methods 90, 92 contemplate implementation in circuitry such as an Application Specific Integrated Circuit (ASIC), Field Programmable Gate Array (FPGA), or other types of logic circuitry included a combination of various different types. The methods 90, 92 provide additional details of the flexible Ethernet mapping process 64. In FIG. 6, the flexible mapping method 90 includes receiving one or more Virtual Lanes (step 93); and mapping each of the one or more Virtual Lanes into an associated Tributary Slot, wherein a rate and number of the Tributary Slots in OTN is set based on a rate and number of the one or more Virtual Lanes (step 94). Remote Management (RM) channels or specific Alignment Markers (AM) can be used to communicate a status of the one or more Virtual Lanes between the router 12 and the transport equipment 14. In FIG. 7, the flexible de-mapping method 92 includes receiving an OTN signal with one or more Tributary Slots contained therein (step 95); and de-mapping each of the one or more Tributary Slots to output a Virtual Lane for each of the one or more Tributary Slots, wherein a rate and number of the one or more Tributary Slots in OTN is set based on a rate and number of the Virtual Lane (step 96). Again, Remote Management (RM) channels or specific Alignment Markers (AM) can be used to communicate a status of one or more Virtual Lanes associated with the one or more Tributary Slots.

The flexible Ethernet mapping process 64 proposes to map each VL 60 into a single TS in an ODUflex. In this manner, a single ODUflex can transport the entire FlexE signal, with the variable rate at the ODUflex. There is a one-to-one correspondence between VLs and TSs. One modification is proposed in OTN, namely defining new TSs that are sized appropriately for the VLs, such as 5G, 25G, etc. TSs. That is, a new PT is proposed in OTN to signify a TS with a rate based on the rate of the VL and flexible amount of TS, e.g. Payload Type (PT)=0x?? where ?? are to be defined.

Figure 8:
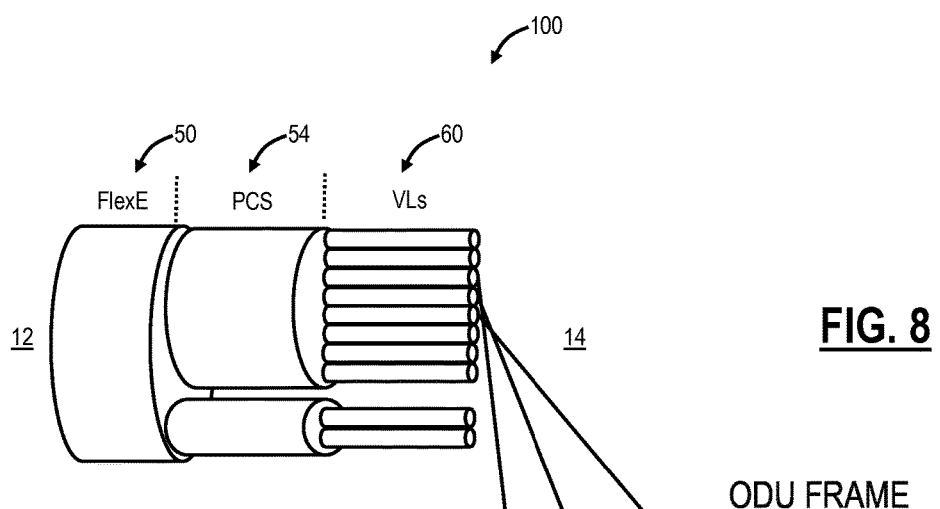
FIG. 8 is a logical diagram of a process illustrating an example of the flexible Ethernet mapping process of FIG. 6 and the methods of FIGS. 6 and 7 of mapping FlexE to OTN.

Referring to FIG. 8, in an exemplary embodiment, a logical diagram illustrates a process 100 as an example for the flexible Ethernet mapping process 64 and the methods 90, 92 of mapping FlexE to OTN. Specifically, the process 100 describes mapping from the router 12 to the transport equipment 14.

For the VLs 60, the process 100 includes bit-demux (possibly) and mapping individual VLs to OPUflex(FlexE) TS 5.1562G (step 106). That is, each VL 60 is mapped to a corresponding TS, e.g. 5.1562G TS. This mapping is shown, for example, in FIG. 8, where VLs 60 are mapped to TS3, TS4, TS5, etc. of an OPUflex (which is part of an ODUflex frame). The IEEE 802.3bj FEC from the MLG is terminated, and transdecode back to 64B66B.

Thus, in various exemplary embodiments, an ODUflex (MLG) structure is proposed which can include:
Rate based on n*5.15625G/25.78125G*239/238
BMP and synchronous to PMD(s)
Multiplexed structure with 5G/25G sized TS, but the number of these varies
Payload Type (PT)=0x??—a new PT is proposed in OTN to signify a TS with a rate based on the rate of the VL and flexible amount of TS
4-byte interleaved TS structure
TS number not tied to frame and can roll around
Payload Structure Identifier (PSI) at Multiframe alignment signal (MFAS)=0 for PT
PSI at MFAS=1 or JC1 for number of TS
PSI at MFAS=2 points or NJO to first TS #

Figures 9A, 9B:
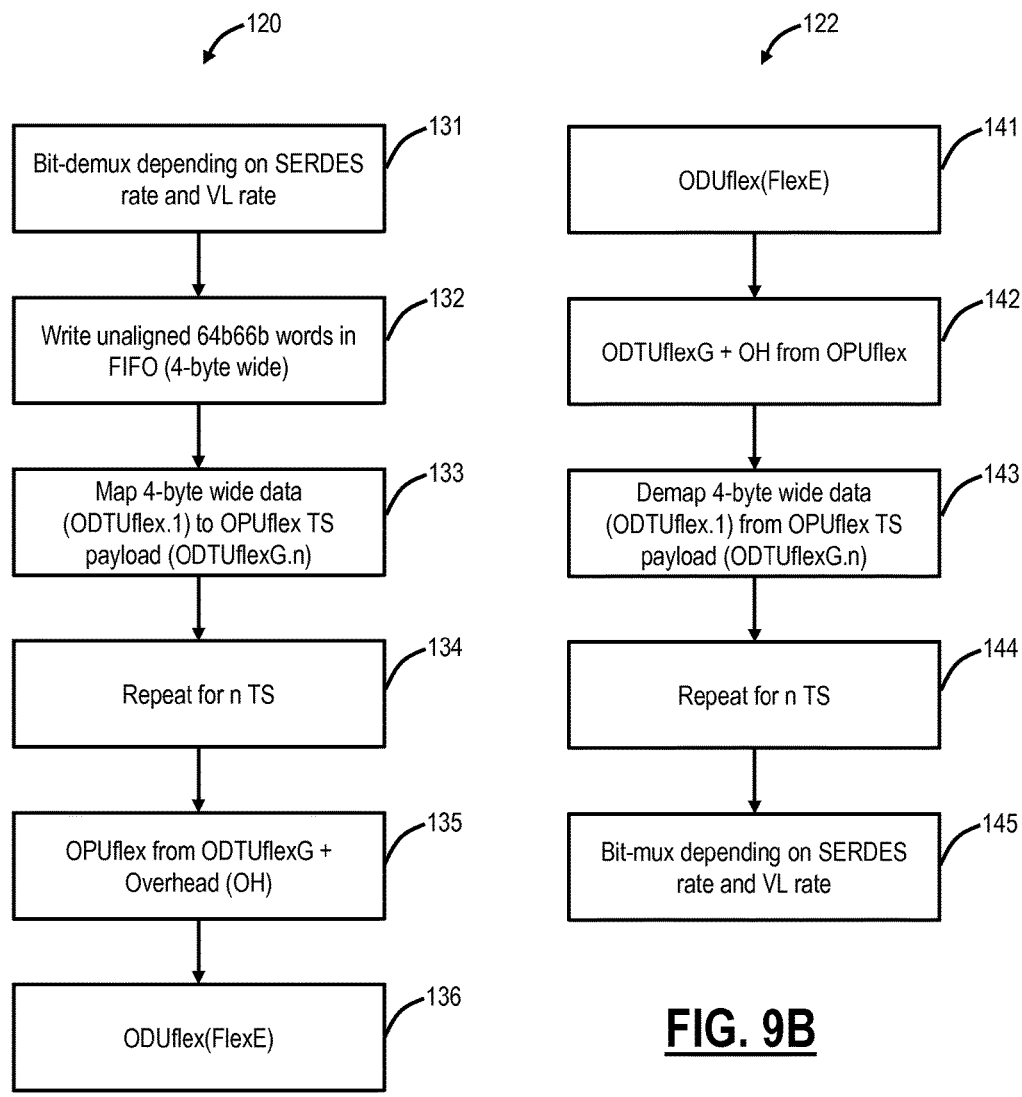
FIGS. 9A and 9B are flow charts of a mapping method and a de-mapping method for the flexible Ethernet mapping process.

Referring to FIGS. 9A and 9B, in exemplary embodiments, flow charts illustrate a mapping method 120 and a de-mapping method 122 for the flexible Ethernet mapping process. The mapping method 120 includes a bit-demultiplexing depending on a Serializer-Deserializer (SERDES) rate and VL rate (step 131), writing unaligned 64B66B words in a First-In-First-Out (FIFO) buffer (e.g., 4-byte wide) (step 132), mapping n-byte wide data (ODTUflex.1) to an OPUflex TS payload (ODTUflexG.n) (step 133), repeating for n TSs (step 134), creating an OPUflex from ODTUflexG+Overhead (OH) (step 135), and providing an ODUflex(FlexE) as an output, such as to the modem (step 136).

The de-mapping method 122 includes receiving an ODUflex(FlexE), such as from the modem (step 141), creating an ODTUflexG+OH from OPUflex (step 142), de-mapping n-byte wide data (ODTUflex.1) from OPUflex TS payload (ODTUflexG.n) (step 143), repeating for n TSs (step 144), and bit-multiplexing depending on SERDES rate and VL rate (step 145).

Note, the flexible Ethernet mapping process does not need to be aware of PCS type (i.e. 100GBASE-R vs. 40GBASE-R) or AM/RM markers. Performance monitoring can be done independent of this and may not be required depending on the application. VL BIP8 or FEC measured error rate (using AMs) could be used for monitoring the PCS.

Figure 10:
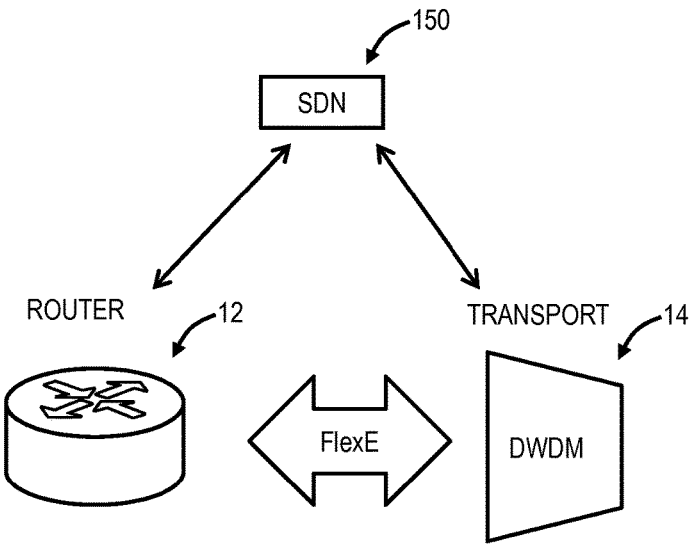
FIG. 10 is a block diagram of a router and transport equipment implementing the flexible Ethernet mapping process, along with a Software Defined Networking (SDN) controller or the like for dynamic resizing.

Referring to FIG. 10, in an exemplary embodiment, a block diagram illustrates a router 12 and transport equipment 14 implementing the flexible Ethernet mapping process, along with a Software Defined Networking (SDN) controller 150 or the like for dynamic resizing. Those of ordinary skill in the art will recognize ODUflex is configured to various types of in-service, dynamic resizing. For example, one such technique is described in G.7044/Y.1347 (formerly G.HAO) (10/11) Hitless Adjustment of ODUflex, the contents of which are incorporated by reference herein. Various other techniques are described in commonly-assigned U.S. patent Ser. No. 14/489,589, filed Sep. 19, 2014, and entitled "ODUFLEX RESIZING SYSTEMS AND METHODS," the contents of which are incorporated by reference herein.

With the flexible Ethernet mapping process, the ODUflex container, carrying VLs as TS, will utilize no more bandwidth than is required on the transport equipment 14, while providing flexibility to dynamically resize as needed by the router 12. This can be through signaling from the SDN controller 150, control plane signaling, or through the Management Communications Channel (MCC). For example, the resizing could be controlled by transport capability advertised to up to SDN by the transport equipment 14, traffic demands communicated via the router 12, or a flexible rate configuration pushed down from the SDN controller 150 to the router 12 and the transport equipment 14. Note, MLG3.0 adds the MCC which can be used as a communication channel for resizing along with the various ODUflex resizing techniques described above.

Figure 11:
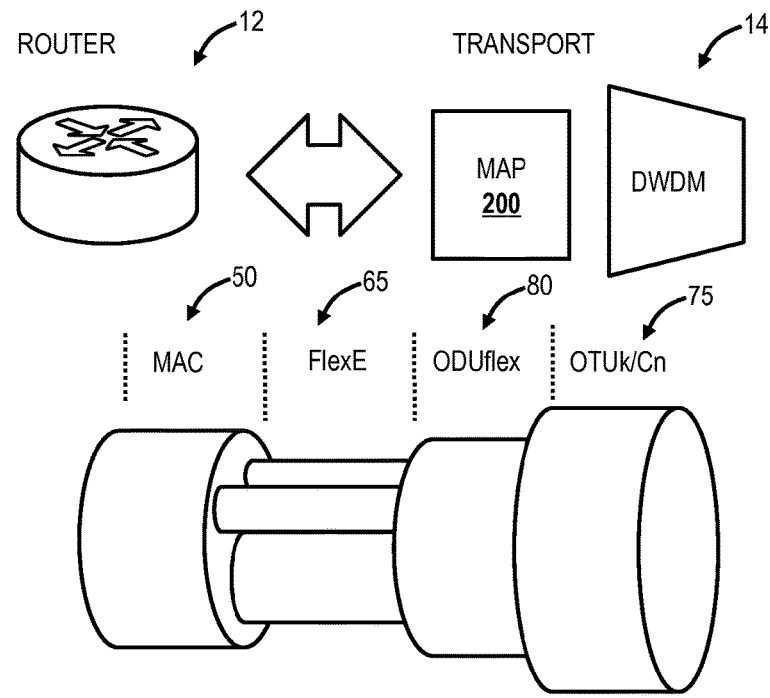
FIG. 11 is a network and logical diagram of an application of the flexible Ethernet mapping process, namely a "fat pipe" configuration between the router and the transport equipment.

Referring to FIG. 11, in an exemplary embodiment, a network and logical diagram illustrates an application of the flexible Ethernet mapping process, namely a "fat pipe" configuration between the router 12 and the transport equipment 14. Here, the router 12 has a single, large MAC 65, with the FlexE Interface 50, to the transport equipment 14. The transport equipment 14 can include a mapper/demapper 200 to implement the various processes described herein, to map the VLs from the router 12 to TSs in an ODUflex.

Figure 12:
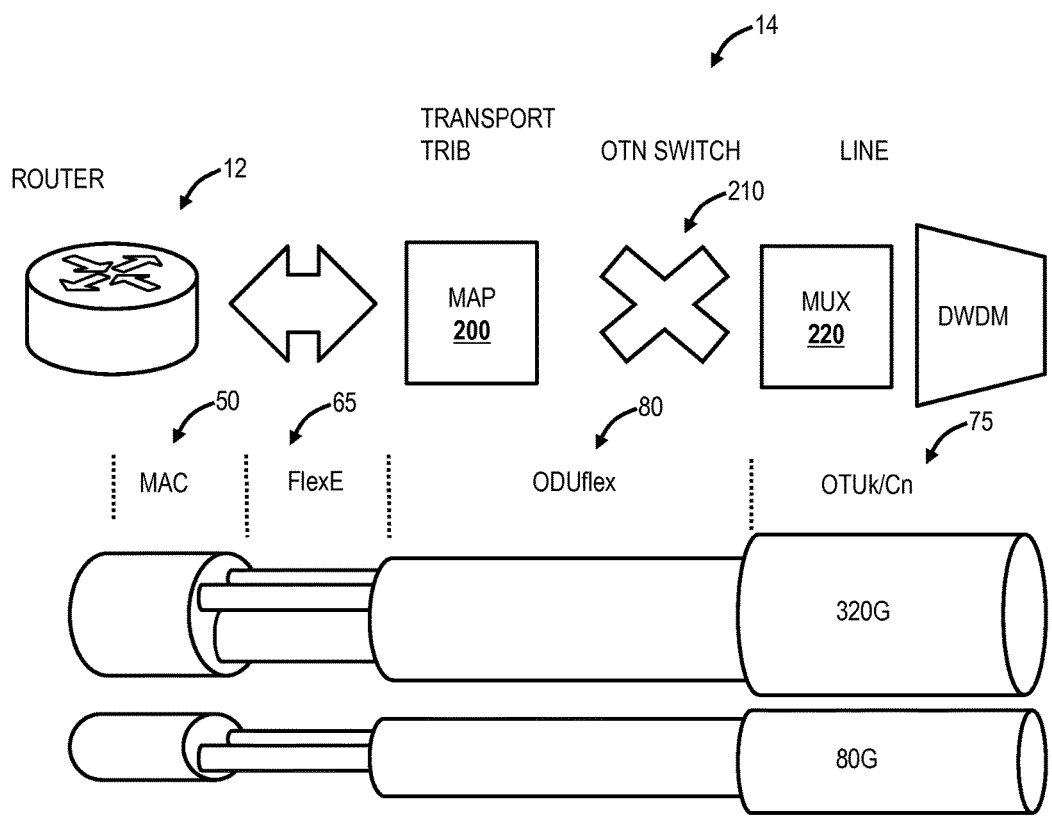
FIG. 12 is a network and logical diagram of another application of the flexible Ethernet mapping process, namely an OTN switching application.

Referring to FIG. 12, in an exemplary embodiment, a network and logical diagram illustrates another application of the flexible Ethernet mapping process, namely an OTN switching application. Here, the MAC 65 can be a 400G router port, split between 320G and 80G, each being mapped via the mapper/demapper 200 into the ODUflex 80 and switched with an OTN switch 210 and multiplexed with a multiplexer 220 into the OTUk/Cn 75.

Figure 13:
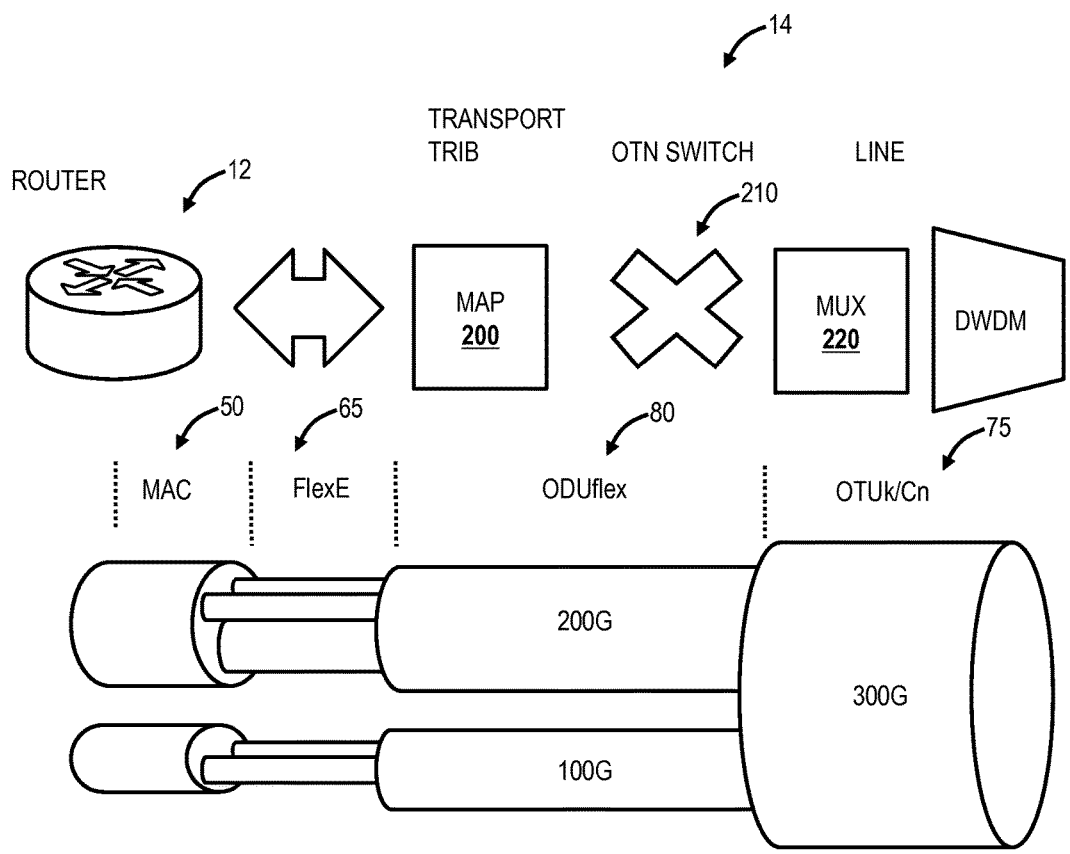
FIG. 13 is a network and logical diagram of another application of the flexible Ethernet mapping process, namely an OTN switching application with Low Order aggregation onto a DWDM line.

Referring to FIG. 13, in an exemplary embodiment, a network and logical diagram illustrates another application of the flexible Ethernet mapping process, namely an OTN switching application with Low Order aggregation onto a DWDM line. Here, there are two router ports, 200G and 100G that are mapped to the ODUflex, which in turn, is aggregated into a single OTUk/Cn.

Figure 14:
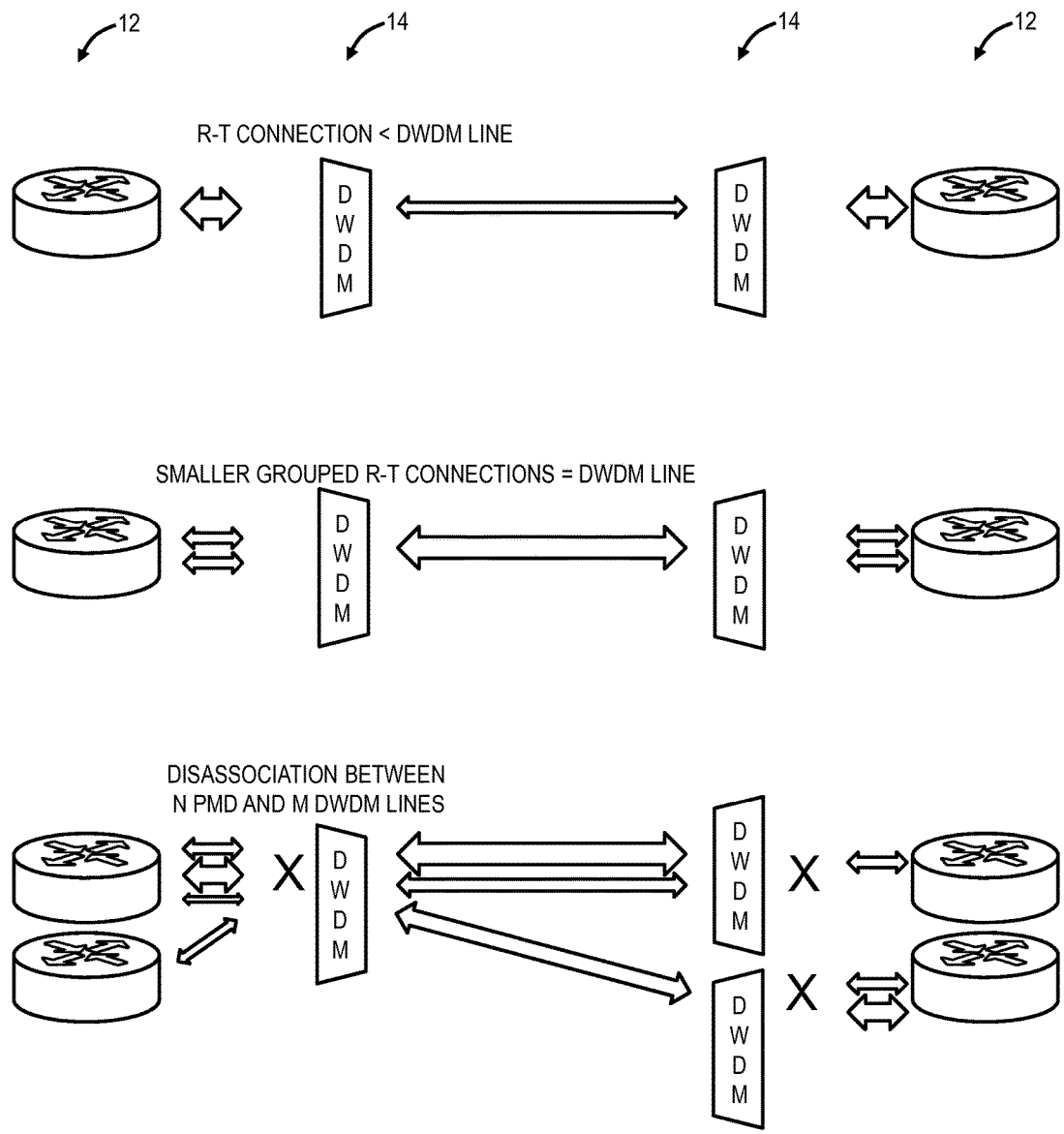
FIG. 14 is network diagrams of various use cases for the flexible Ethernet mapping process.

Referring to FIG. 14, in an exemplary embodiment, network diagrams illustrate various use cases for the flexible Ethernet mapping process. In one exemplary embodiment, the flexible Ethernet mapping process provides a router-to-transport equipment connection that is a lower rate than the overall DWDM line. In another exemplary embodiment, the flexible Ethernet mapping process provides smaller grouped router-to-transport equipment connections equal to the DWDM line. In a further exemplary embodiment, the flexible Ethernet mapping process provides disassociation between N PMD and M DWDM lines, N and M are integers.

Figure 15A:
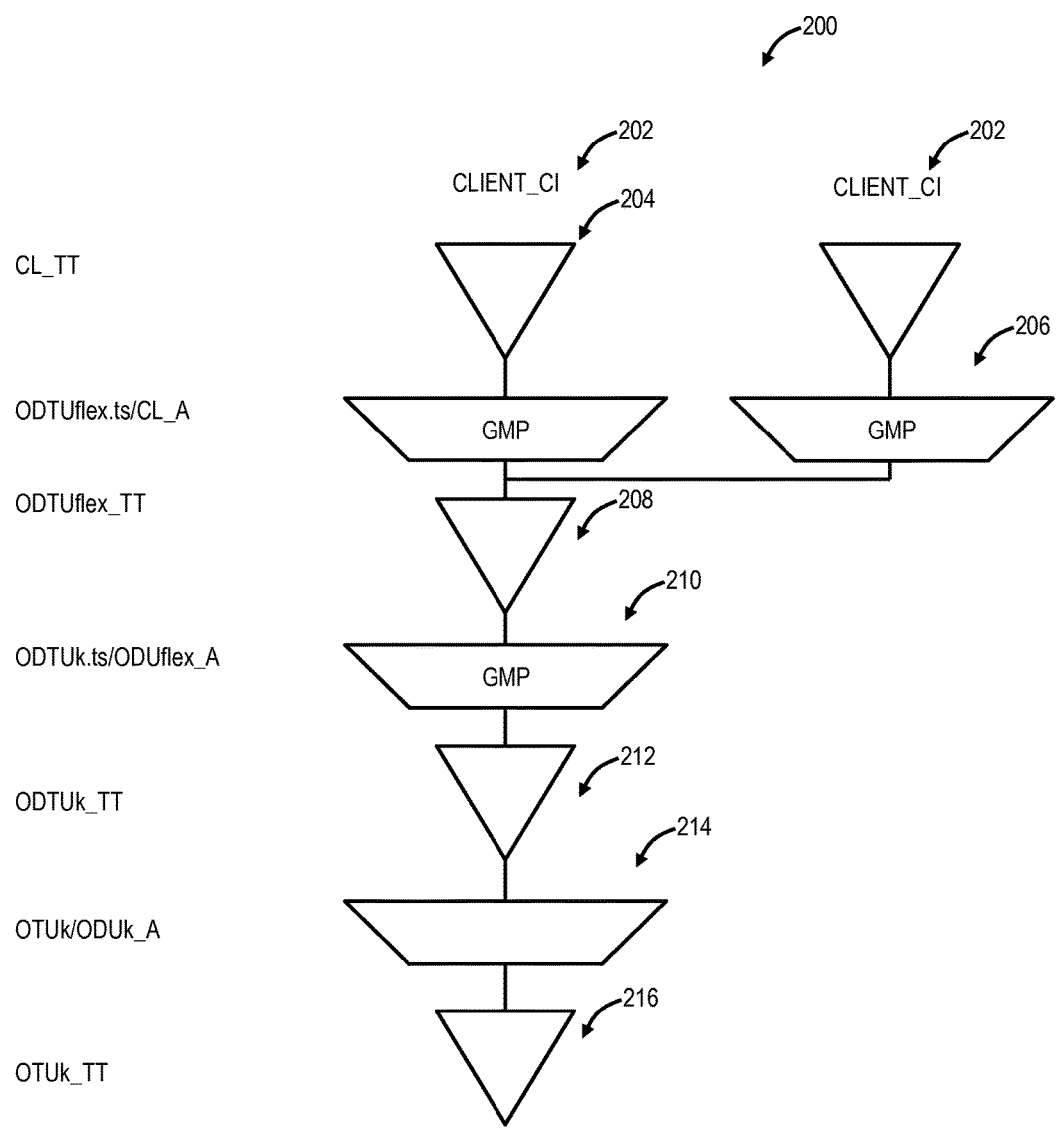
FIGS. 15A and 15B are diagrams of a set of atomic functions associated with creating a channelized ODUflex into an ODUk (FIG. 15A) and into an ODUCn (FIG. 15B)
Figure 15B:
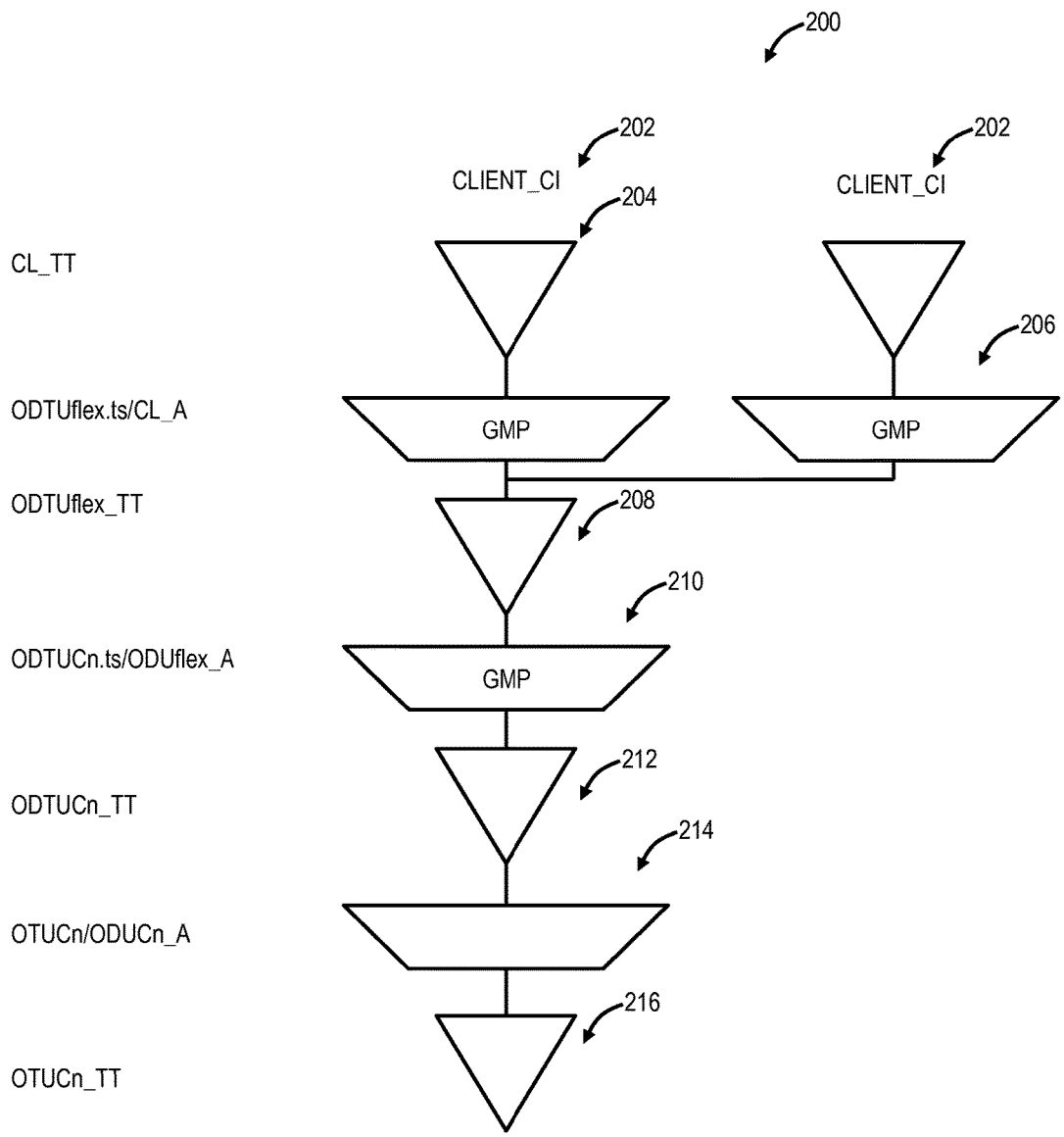

Referring to FIGS. 15A and 15B, in an exemplary embodiment, diagrams illustrate a set of atomic functions 200 associated with creating a channelized ODUflex and mapping into an ODUk (FIG. 15A) and into an ODUCn (FIG. 15B). In the atomic functions 200, client data, represented by Client_CI 202 which is trail terminated at CL_TT 204, can be directly mapped into ODTUflex.ts using GMP (represented by adaptation functions 206), and the OPUflex multiframe overhead (OH) can be used for Cm/CnD timing characteristic information of the client signal. CI in the Client_CI 202 refers to characteristic information which is a signal with a specific format, which is transferred on "network connections" as defined in ITU-T G.805 entitled "Generic functional architecture of transport networks" (03/2000), the contents of which are incorporated by reference. ODTUflex.ts is defined herein as an Optical channel Data Tributary Unit flexible with ts number of tributary slots. The ODTUflex.ts subsequent to the adaptation functions 206 is provided to an ODUflex trail termination function 208. Note, while FIGS. 15A and 15B illustrate GMP mapping, the systems and methods described herein also contemplate BMP mapping. Of course, the clients need to be all synchronous and homogeneous to support BMP.

The ODUflex trail termination function 208 is followed by a GMP adaptation function 210 to Optical channel Data Tributary Unit k with ts tributary slots (ODTUk.ts). This could include a HO ODUk or Cn. Subsequent to the adaptation function 210, there is an ODUk trail termination 212 (ODUk_TT), followed by an adaptation process 214 (OTUk/ODUk_A) followed by an OTUk trail termination 216.

Again, the channelized ODUflex systems and methods provide a multiplexed structure out of an ODUflex payload. This structure could require a new PT code point, e.g., PT=0x23-2F. The Multiplex Structure Identifier (MSI) could reflect a number of TSs and client assignments in an LO ODUflex structure. The MSI describes the allocation of tributary slots to ODTUflex that contain the client or ODUj. Each ODTUflex is identified by means of either a 2-tuple <ODTU type, tributary port number> (k=1,2,3), or <tributary slot occupation, tributary port number> (k=4). An ODTU is carried in one or more tributary slots a, b, . . . , n. The HO ODUk Cm/CnD GMP parameters can be used to reflect the rate of an LO ODUflex aggregate signal.

The adaptation of the client into ODTUflex.ts can be GMP or BMP (as indicated above). This could be adaptation of ODUk (like ODU0) into ODTUflex.ts. The novel aspect here is the number and size of these ODTUflex.ts. OTN has no current support for clients directly into a multiplexed structure.

Figure 16A:
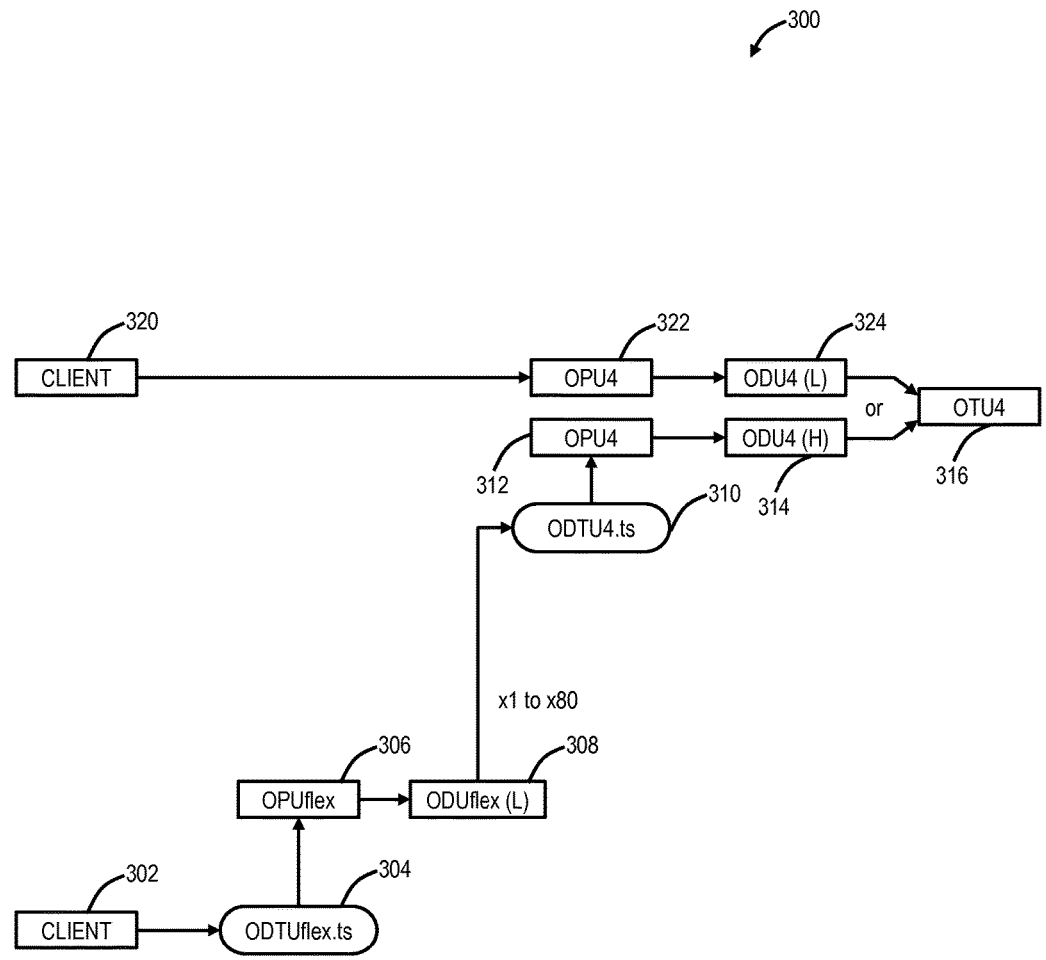
FIGS. 16A and 16B are diagrams of a portion of an OTN hierarchy with the channelized ODUflex illustrating an ODU4 and an ODUflex LO mapped into an OTU4 (FIG. 16A) and into an OTUCn (FIG. 16B)
Figure 16B:
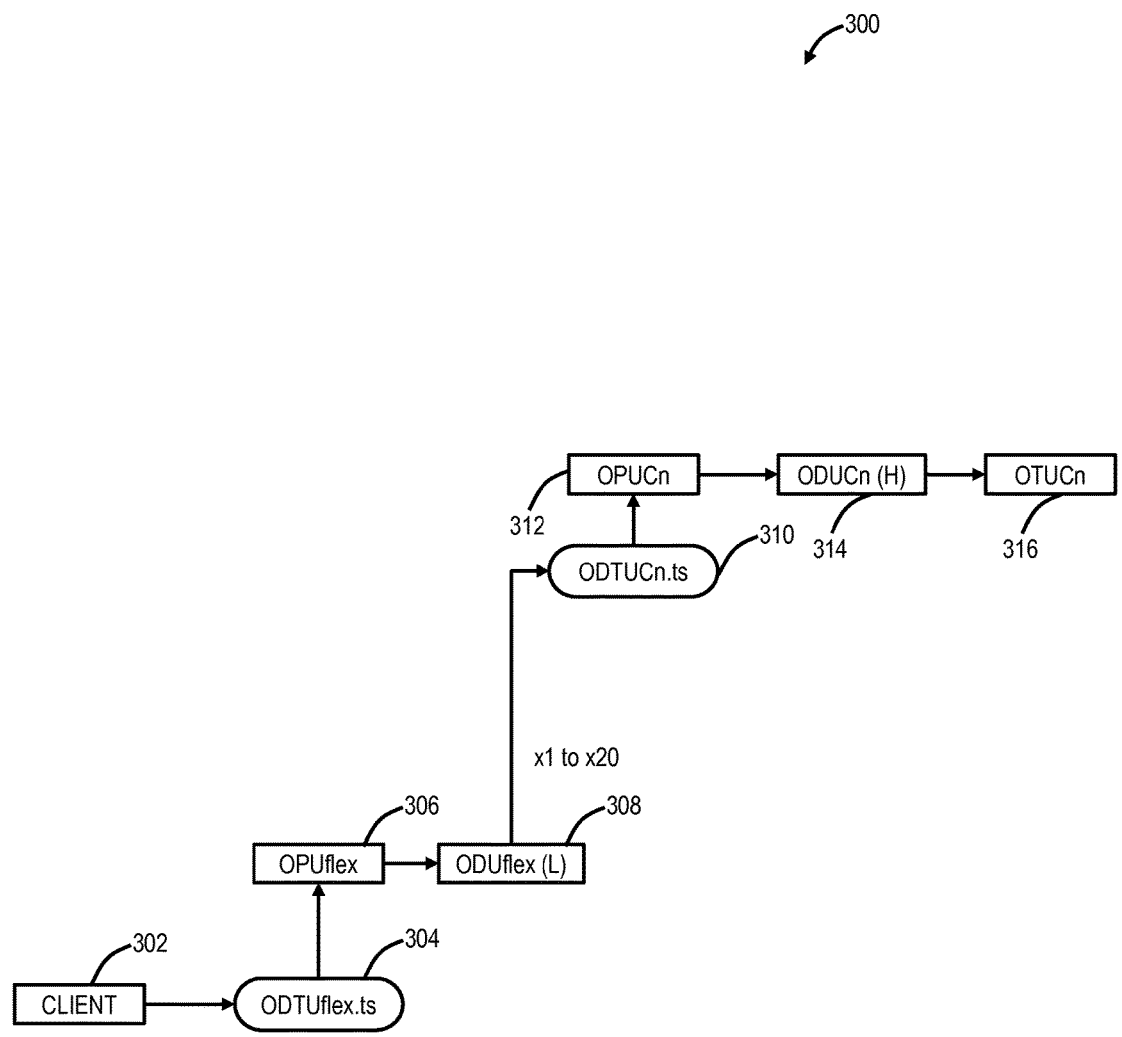

Referring to FIGS. 16A and 16B, in an exemplary embodiment, a diagram illustrates a portion of an OTN hierarchy 300 with the channelized ODUflex illustrating an example ODU4 and an ODUflex LO mapped into an OTU4. Those of ordinary skill in the art will recognize that other client mappings are also contemplated, and FIGS. 16A and 16B are presented for illustration purposes only. In one example, a client 302 is multiplexed into TSs in an ODTUflex.ts 304. Again, the ODTUflex.ts 304 is channelized, supporting both a variable rate and a variable number of channels. That is, the ODTUflex.ts 304 can have 1 to n TSs each with a rate of 100G/n to 100G. The ODTUflex.ts 304 is mapped into an OPUflex 306, which is mapped into an LO ODUflex (L) 308. The ODUflex (L) 308 can be mapped to 1 to 80 TSs which are multiplexed into an ODTU4.ts 310 and each of the TSs in the ODTU4.ts 310 have a rate of about 1.25G. The ODTU4.ts 310 is mapped into an OPU4 312 which is mapped into an HO ODU4 (H) 314 which is mapped into an OTU4 316. In another example, a client 320 is mapped into an OPU4 322 which is mapped into an ODU4 (L) 324 which is then mapped into the OTU4 316.

Assume the clients 302, 320 are both low rate signals, relative to an ODU4. Again, as described herein, a low rate signal is one that is inefficiently mapped into OTN given the only available TS rates conventionally are 1.25G, 2.5G (for ODU1, 2, and 3), and 5G (for ODUCn). Of course, Fast Ethernet (100 Mb/s) is a low rate signal for all of the available TS rates. Thus, the term "low rate" is meant to indicate a signal is now efficiently mapped into an OTN TS. In FIG. 16, a low rate signal for the client 320 is inefficient in the mapping to the OTU4, leading to wasted or stranded bandwidth. The channelized ODUflex systems and methods propose to allow finer granularity in TS mapping in the ODTUflex.ts 304. One example is when service low-rate clients using ODUk (i.e. 4) and limited to min 1.25G structure. The other example is used for B100G signals and shows that as one moves forward, there is a need to optimize for B100G clients, but there is still a way to efficiently transport (without burden) low-rate signals.

Figure 17:
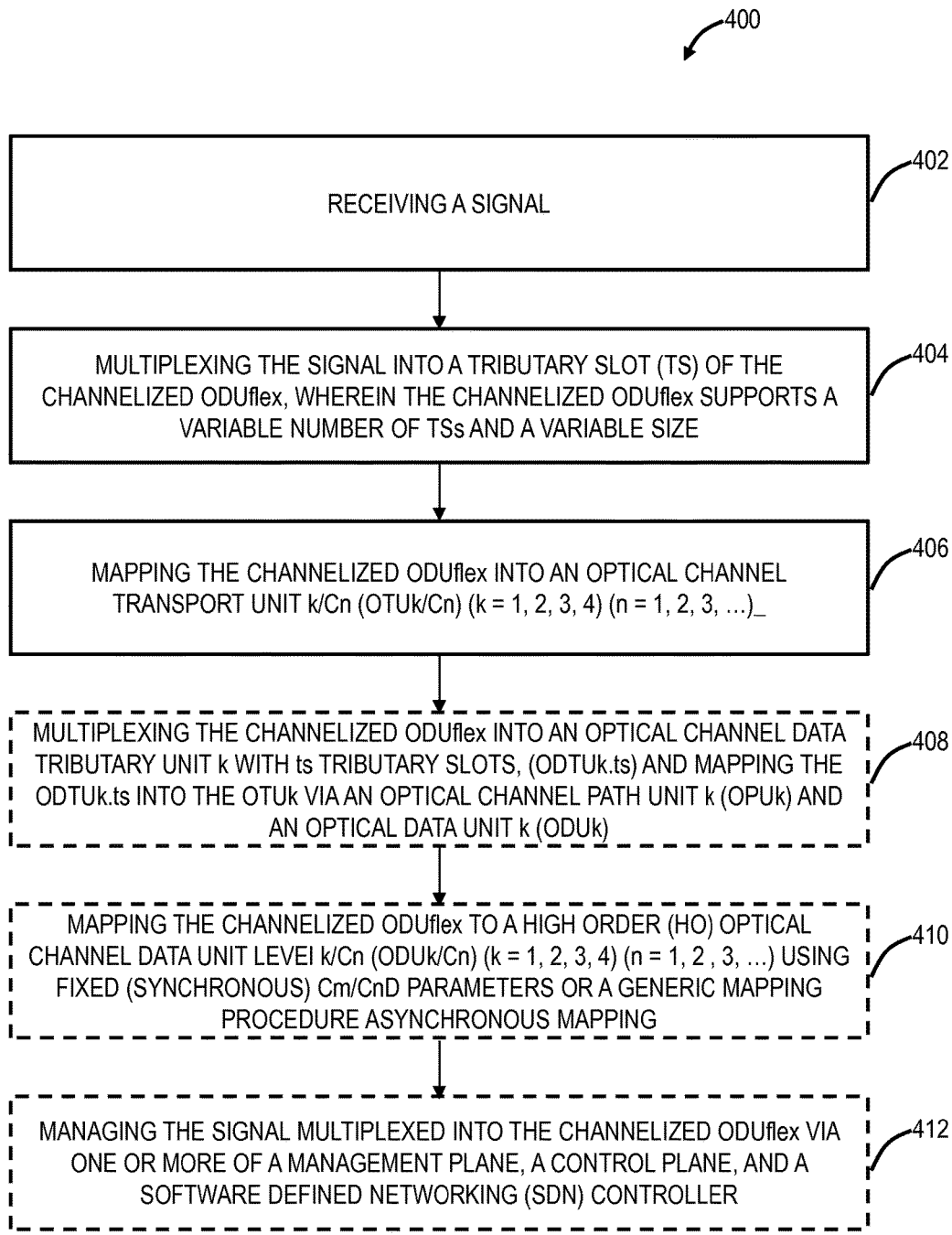
FIG. 17 is a flowchart of a channelized ODUflex process.

Referring to FIG. 17, in an exemplary embodiment, a flowchart illustrates a channelized ODUflex process 400. The process 400 is implemented in circuitry and can provide a channelized Optical channel Data Unit flexible (ODUflex). The process 400 includes receiving a signal (step 402); multiplexing the signal into a single or set of Tributary Slot(s) (TS) of the channelized ODUflex, wherein the channelized ODUflex supports a variable number of TSs and a variable size (step 404); and mapping the channelized ODUflex into an Optical channel Transport Unit k (OTUk/Cn) (k=1, 2, 3, 4) (n=1, 2, 3, . . . ) (step 406). The process 400 can include multiplexing the channelized ODUflex into an Optical channel Data Tributary Unit k/Cn with ts tributary slots, (ODTUk/Cn.ts) and mapping the ODTUk/Cn.ts into the OTUk/Cn via an Optical channel Path Unit k/Cn (OPUk/Cn) and an Optical Data Unit k/Cn (ODUk/Cn) (step 408).

The OTUk has two levels of TS multiplexing with a first level of TS multiplexing into the channelized ODUflex and a second level of TS multiplexing of the ODUflex into an Optical channel Data Tributary Unit k/Cn with ts tributary slots (ODTUk/Cn.ts). A size of the channelized ODUflex can be selected to match a size of one or more TSs associated with a High Order (HO) Optical channel Data Unit level k/Cn (ODUk/Cn) (k=1, 2, 3, 4), (n=1, 2, 3, . . . ). The method can further include mapping the channelized ODUflex to a High Order (HO) Optical channel Data Unit level k/Cn (ODUk/Cn) (k=1, 2, 3, 4), (n=1, 2, 3, . . . ) using fixed (synchronous) Cm/CnD parameters or a Generic Mapping Procedure asynchronous mapping (step 410). The method can further include managing the signal multiplexed into the channelized ODUflex via one or more of a management plane, a control plane, and a Software Defined Networking (SDN) controller (step 412). The signal does not efficiently map to a TS of sizes 1.25G, 2.5G, and 5G.

Figure 18:
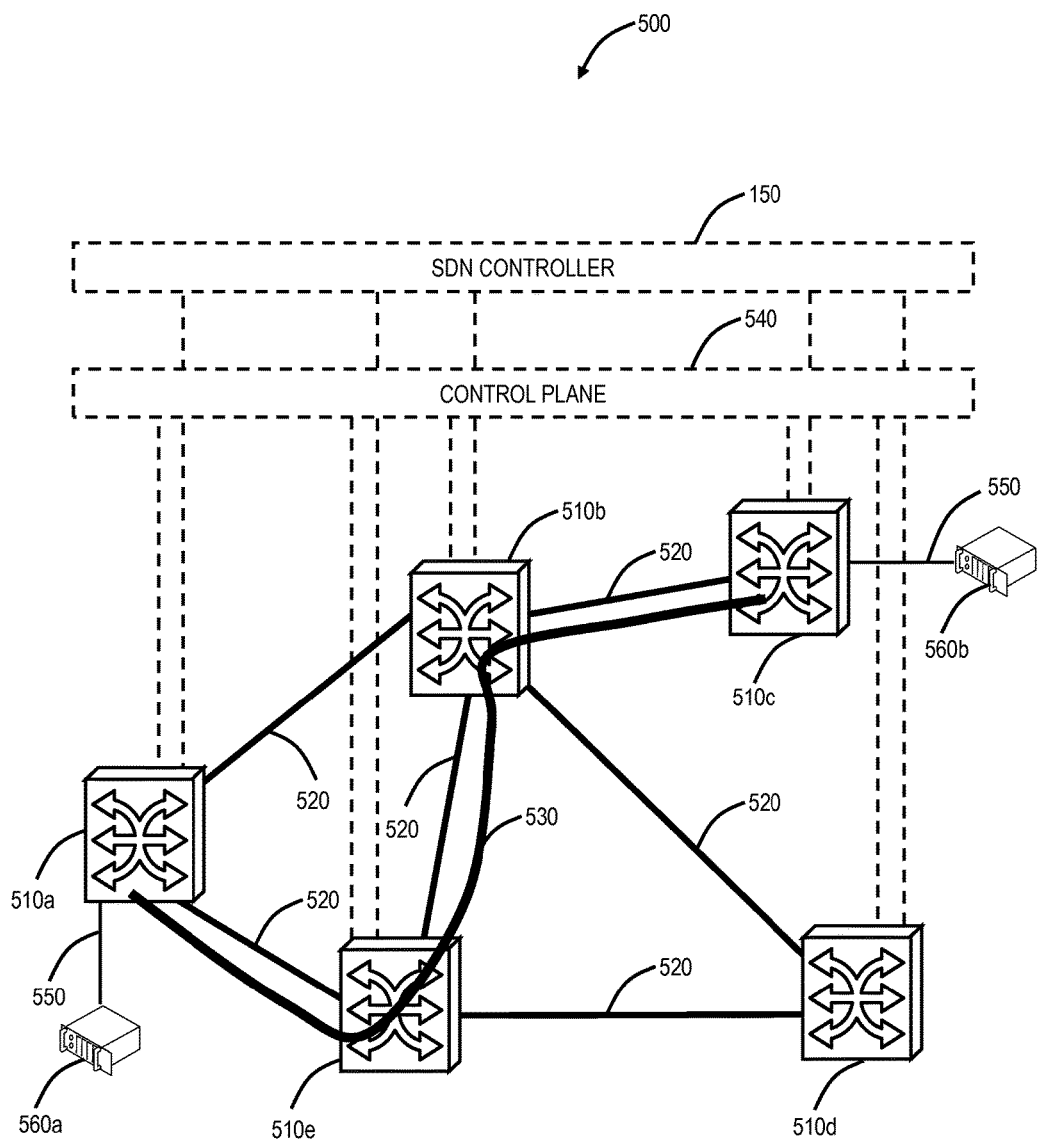
FIG. 18 is a network diagram of an exemplary network with five interconnected nodes.
Figure 19:
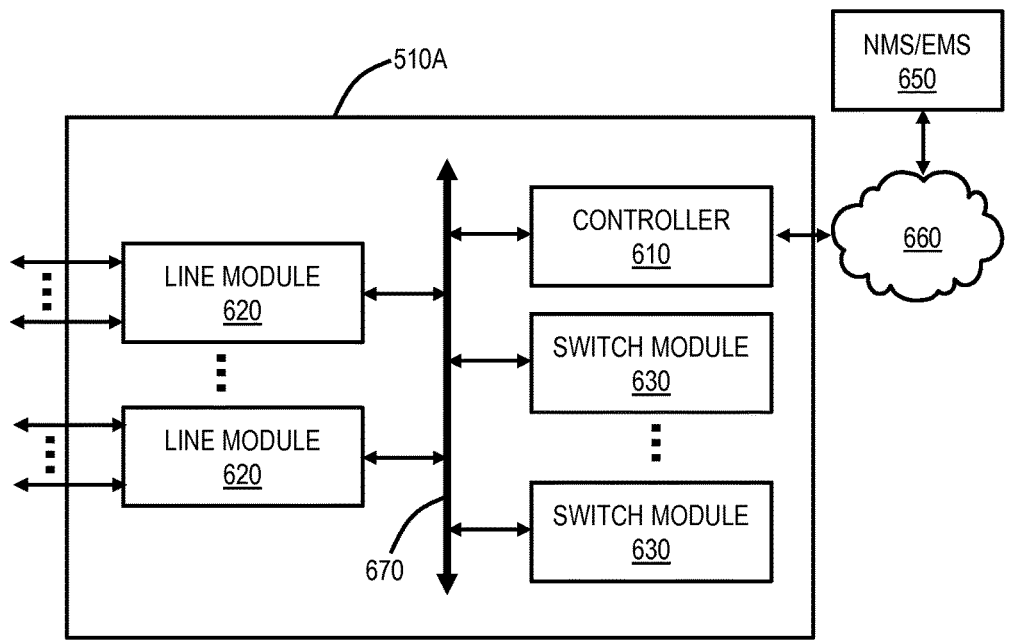
FIG. 19 is a block diagram of an exemplary node in the network of FIG. 18 using the channelized ODUflex systems and methods.

Referring to FIG. 18, in an exemplary embodiment, a network diagram illustrates an exemplary network 500 with five interconnected nodes 510a, 510b, 510c, 510d, 510e. The nodes 510 are interconnected through a plurality of links 520. The nodes 510 communicate with one another over the links 520 which are OTN links, e.g., OTU4, OTUC4, etc. The nodes 510 can be network elements which include a plurality of ingress and egress ports forming the links 520. An exemplary network element 510A is illustrated in FIG. 19. The network 500 includes a connection 530 with ingress/egress at the nodes 510a, 510c and intermediate nodes 510b, 510e. The connection 530 can be a Sub-Network Connection (SNC), a Label Switched Path (LSP), or the like. The connection 530 is an end-to-end signaled path and from the view of the client signal contained therein, it is seen as a single network segment. Of course, the network 500 can include a plurality of connections. The nodes 510 can also be referred to interchangeably as network elements (NEs). The network 500 is illustrated, for example, as an interconnected mesh network, and those of ordinary skill in the art will recognize the network 500 can include other architectures, with additional nodes 510 or with fewer nodes 510, etc.

The network 500 can include a control plane 540 operating on and/or between the nodes 510a, 510b, 510c, 510d, 510e. The control plane 540 includes software, processes, algorithms, etc. that control configurable features of the network 500, such as automating discovery of the nodes 510, capacity on the links 520, port availability on the nodes 510, connectivity between ports; dissemination of topology and bandwidth information between the nodes 510; calculation and creation of paths for connections; network level protection and restoration; and the like. The control plane 540 may include Automatically Switched Optical Network (ASON) as defined in ITU-T G.8080/Y.1304, Architecture for the automatically switched optical network (ASON) (02/2012), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections between the nodes 510. Those of ordinary skill in the art will recognize the network 500 and the control plane 540 can utilize any type of control plane for controlling the nodes 510 and establishing and maintaining connections, such as at and between Layers 0, 1, 2, 3+, etc. Layers 3+ include the network through application layers (Layers 3-7).

An SDN controller 150 can also be communicatively coupled to the network 500 through one or more of the nodes 510. SDN is an emerging framework which includes a centralized control plane decoupled from the data plane. SDN works with the SDN controller 150 knowing a full network topology through configuration or through the use of a controller-based discovery process in the network 500. The SDN controller 150 differs from a management system in that it controls the forwarding behavior of the nodes 510 only, and performs control in real time or near real time, reacting to changes in services requested, network traffic analysis and network changes such as failure and degradation. Also, the SDN controller 150 provides a standard northbound interface to allow applications to access network resource information and policy-limited control over network behavior or treatment of application traffic. The SDN controller 150 sends commands to each of the nodes 510 to control matching of data flows received and actions to be taken, including any manipulation of packet contents and forwarding to specified egress ports. Examples of SDN include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

In an exemplary embodiment, the network 500 contemplates the use of the control plane 540. In another exemplary embodiment, the network 500 contemplates the SDN controller 150. In a further exemplary embodiment, the network 500 can include both the control plane 540 and the SDN controller 150. In a further exemplary embodiment, the network 500 can utilize a Network Management System (NMS), Element Management System (EMS), or the like. Other embodiments are also contemplated. As is described herein, the channelized ODUflex systems and methods contemplate operation in the network 500 and/or with the nodes 510 with any control or management plane techniques.

The network 500 can include a low rate signal 550 between switches 560a, 560b. The switches 560a, 560b can be Customer Premises Equipment (CPE) or the like. Note, the connection 530 and the low rate signal 550 are shown for illustration purposes, and those of ordinary skill in the art will appreciate the network 500 contemplates various other connections, signals, etc. Again, the low rate signal 550 can be an OCn, E1, Fast Ethernet, 2.5 GbE, any Ethernet variant that does not efficiently map into 1.25G, 2.5G, or 5G TSs, and the like. Using the channelized ODUflex systems and methods, the low rate signal 550 is configured between the nodes 510a, 510b via the connection 530. In an exemplary embodiment, the connection 530 is an OTU4, OTUC4, etc. The low rate signal 550 can be mapped with other low rate signals into a channelized ODUflex, which is then mapped into an ODTU4.ts TS. Thus, the connection 530 can support multiple low rate signals 550 efficiently. Again, the channelized ODUflex systems and methods extend current capabilities of existing OTN standards with familiar mapping schemes and TS structures. ODUflex was initially meant to wrap (synchronously) a client signal and currently only has capabilities to support a single client (1:1). With the channelized ODUflex systems and methods, the ODUflex can now support channelization. For example, assume the low rate signal 550 is an FE signal (100M). An ODUflex that is 1.25G can support 10 or so of the FE signals, and occupy one TS in the OTU4, OTUC4, etc.

In an exemplary embodiment, the connection 530 can be used to introduce tunneling in the network 500 using OTN. That is, the signal, which can be a client or an ODUj 550 can be transported in a variable rate ODUflex tunnel for OTN virtual transport applications, providing a Private Line (PL) service. Here, the signal 550 remains encapsulated in the OTN domain throughout the network 500, traversing the nodes 510 similar to an OTN SNC or LSP. Advantageously, the control plane 540 and/or the SDN controller 150 can manage the low rate signal 550 directly, rather than requiring another control domain where the low rate signal 550 is aggregated in SONET/SDH, packet, etc. Here, a flexible pipe is provided by one domain and another domain can provision ODUk and clients in the flexible pipe.

Again, in another exemplary embodiment, the signal 550 can be used to support 1 GbE, 2.5 GbE, and 5 GbE into ODUj, B100G mappings, etc. In another exemplary embodiment, the connection 530 can be used to carry multiple FlexE clients (a group) into the single ODUflex transport container, using the channelized ODUflex systems and methods.

Referring to FIG. 19, in an exemplary embodiment, a block diagram illustrates an exemplary node 510A in the network 500 using the channelized ODUflex systems and methods. In an exemplary embodiment, the exemplary node 510A can be a network element that may consolidate the functionality of a Packet-Optical Transport System (POTS), Multi-Service Provisioning Platform (MSPP), Digital Cross Connect (DCS), Ethernet and/or Optical Transport Network (OTN) switch, Wave Division Multiplexed (WDM) platform, etc. into a single, high-capacity intelligent switching system providing Layer 0, 1, and/or 2 consolidation. In another exemplary embodiment, the node 510A can be any of an OTN Add/Drop Multiplexer (ADM), Reconfigurable Optical Add/Drop Multiplexer (ROADM), an MSPP, a DCS, a POTS, an optical cross-connect, an optical switch, a router, a switch, a WDM platform, an access/aggregation device, etc. That is, the node 110 510A can be any digital system with ingress and egress digital signals and switching of channels, timeslots, tributary units, etc. and/or photonic system with ingress and egress wavelengths and switching. While the node 510A is generally shown as an optical network element, the systems and methods contemplated for use with any switching fabric, network element, or network utilizing OTN.

In an exemplary embodiment, the node 510A includes a controller 610, one or more line modules 620, and one or more switch modules 630. The controller 610 can include Operations, Administration, Maintenance, And Provisioning (OAM&P) access; user interface ports; and the like. The controller 610 can connect to a management system 650 through a data communications network 660 (as well as a Path Computation Element (PCE), the SDN controller 150, OpenFlow controller, etc.). The management system 650 can include a network management system (NMS), element management system (EMS), or the like. Additionally, the controller 610 can be configured to operate the control plane as described herein. The node 510A can include an interface 670 for communicatively coupling the controller 610, the line modules 620, and the switch modules 630 together. For example, the interface 670 can be a backplane, midplane, a bus, optical or electrical connectors, or the like.

The line modules 620 are configured to provide ingress and egress to the switch modules 630 and to external connections forming the links 520. From a logical perspective, the line modules 620 provide ingress and egress lines to the node 510A, and each line module 620 can include one or more physical ports which form the lines. The line modules 620 provide outputs at OTUk/Cn rates (k=1, 2, 3, 4), Cn and can include hardware for provisioning connections in the OTUk/Cn. Specifically, the line modules 620 can include the channelized ODUflex that is mapped/multiplexed into the OTUk/Cn. The switch modules 630 are configured to switch channels, wavelengths, timeslots, tributary units, packets, etc. between the line modules 620.

Those of ordinary skill in the art will recognize the node 510A can include other components which are omitted for illustration purposes, and that the systems and methods described herein is contemplated for use with a plurality of different network elements with the node 510A presented as an exemplary type of a network element. For example, in another exemplary embodiment, the node 510A may not include the switch modules 630, but rather have the corresponding functionality in the line modules 620 (or some equivalent) in a distributed fashion. For the node 510A, other architectures providing ingress, egress, and switching between are also contemplated for the systems and methods described herein.

In an exemplary embodiment, a network element configured to operate in an Optical Transport Network (OTN) network includes one or more ports coupled to switching circuitry, wherein a first port is configured to receive a signal, wherein the switching circuitry is configured to multiplex the signal into a Tributary Slot (TS) of a channelized Optical channel Data Unit flexible (ODUflex), wherein the channelized ODUflex supports a variable number of TSs and a variable size, and wherein a second port is configured to map the channelized ODUflex into an Optical channel Transport Unit k (OTUk/Cn) (k=1, 2, 3, 4), Cn (n=1, 2, 3, . . . ). The switching circuitry can be configured to multiplex the channelized ODUflex into an Optical channel Data Tributary Unit k with ts tributary slots, (ODTUk.ts) and mapping the ODTUk.ts into the OTUk via an Optical channel Path Unit k (OPUk) and an Optical Data Unit k (ODUk).

The OTUk has two levels of TS multiplexing with a first level of TS multiplexing into the channelized ODUflex and a second level of TS multiplexing of the channelized ODUflex into an Optical channel Data Tributary Unit k with ts tributary slots (ODTUk/Cn.ts). A size of the channelized ODUflex can be selected to match a size of one or more TSs associated with a High Order (HO) Optical channel Data Unit level k (OTUk/Cn) (k=1, 2, 3, 4), Cn (n=1, 2, 3, . . . ). The switching circuitry can be configured to map the channelized ODUflex to a High Order (HO) Optical channel Data Unit level k (OTUk/Cn) (k=1, 2, 3, 4), Cn (n=1, 2, 3, . . . ) using fixed (synchronous) Cm/CnD parameters or a Generic Mapping Procedure asynchronous mapping. The network element can further include a controller communicatively coupled to the plurality of ports and configured to manage the signal multiplexed into the channelized ODUflex via one or more of a management plane, a control plane, and a Software Defined Networking (SDN) controller. The signal does not efficiently map to a TS of sizes 1.25G, 2.5G, and 5G.

The channelized ODUflex systems and methods provide a cost-effective mechanism to support low rate signals a size of the line modules 620 scales. For example, a fixed number of channelized ODUflex resources could be present in next-gen (500G/1T) framers to aggregate some LO ODU0/ GbE packet services from the switch modules 630. These next-gen framer devices would likely only support 5G TS sizes and would not be able to service ODU0/1GE-sized flows efficiently. Also, the channelized ODUflex systems and methods contemplate operation in smaller sized access products. For example, the node 510A can be an access product.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented in circuitry, to provide a channelized Optical channel Data Unit flexible (ODUflex), the method comprising:
   receiving a signal;
   multiplexing the signal into a Tributary Slot (TS) of the channelized ODUflex, wherein the channelized ODUflex supports a variable number of TS s which is N, N is an integer, and a variable size of the TSs which is a rate of 100/N in Gb/s and the channelized ODUflex is a Low Order (LO) ODUflex, wherein the signal is multiplexed in the channelized ODUflex with one or more additional signals each in an associated TS of the variable number of TSs and the channelized ODUflex carries a plurality of signals comprising the signal and the one or more additional signals, and wherein the channelized ODUflex has a Payload Type which is based on the variable number of TSs and the variable size of the TSs; and
   mapping the channelized ODUflex into an Optical channel Transport Unit k/Cn (OTUk/Cn) (k=1, 2, 3, 4) and (n=1, 2, 3, . . . ).

2. The method of claim 1, wherein the mapping comprises multiplexing the channelized ODUflex into an Optical channel Data Tributary Unit k/Cn with ts tributary slots, (ODTUk/Cn.ts) and mapping the ODTUk/Cn.ts into the OTUk/Cn via an Optical channel Path Unit k/Cn (OPUk/Cn) and an Optical Data Unit k/Cn (ODUk/Cn).

3. The method of claim 1, wherein the OTUk/Cn has two levels of TS multiplexing with a first level of TS multiplexing into the channelized ODUflex and a second level of TS multiplexing of the channelized ODUflex into an Optical channel Data Tributary Unit k/Cn with ts tributary slots (ODTUk/Cn.ts).

4. The method of claim 1, wherein a size of the channelized ODUflex is selected to match a size of one or more TSs associated with a High Order (HO) Optical channel Payload Unit level k/Cn (OPUk/Cn) (k=1, 2, 3, 4), (n=1, 2, 3, . . . ).

5. The method of claim 1, wherein the mapping comprises mapping the channelized ODUflex to a High Order (HO) Optical channel Data Unit level k/Cn (ODUk) (k/Cn=k=1, 2, 3, 4), (n=1, 2, 3, . . . ) using fixed (synchronous) Cm/CnD parameters or a Generic Mapping Procedure asynchronous mapping.

6. The method of claim 1, further comprising:
   managing the signal multiplexed into the channelized ODUflex via one or more of a management plane, a control plane, and a Software Defined Networking (SDN) controller.

7. The method of claim 1, wherein the signal does not efficiently map to a TS of sizes 1.25G, 2.5G, and 5G.

8. A network element configured to operate in an Optical Transport Network (OTN) network, the network element comprising:
   one or more ports coupled to switching circuitry,
   wherein a first port is configured to receive a signal, wherein the switching circuitry is configured to multiplex the signal into a Tributary Slot (TS) of a channelized Optical channel Data Unit flexible (ODUflex), wherein the channelized ODUflex supports a variable number of TSs which is N, N is an integer, and a variable size of the TSs which is a rate of 100/N in Gb/s and the channelized ODUflex is a Low Order (LO) ODUflex, and wherein a second port is configured to map the channelized ODUflex into an Optical channel Transport Unit k (OTUk/Cn) (k=1, 2, 3, 4), (n=1, 2, 3, . . . ), wherein the signal is multiplexed in the channelized ODUflex with one or more additional signals each in an associated TS of the variable number of TSs and the channelized ODUflex carries a plurality of signals comprising the signal and the one or more additional signals, and wherein the channelized ODUflex has a Payload Type which is based on the variable number of TSs and the variable size of the TSs.

9. The network element of claim 8, wherein the switching circuitry is configured to multiplex the channelized ODUflex into an Optical channel Data Tributary Unit k/Cn with ts tributary slots, (ODTUk/Cn.ts) and mapping the ODTUk/Cn.ts into the OTUk/Cn via an Optical channel Path Unit k (OPUk/Cn) and an Optical Data Unit k/Cn (ODUk/Cn).

10. The network element of claim 8, wherein the OTUk/Cn has two levels of TS multiplexing with a first level of TS multiplexing into the channelized ODUflex and a second level of TS multiplexing of the channelized ODUflex into an Optical channel Data Tributary Unit k/Cn with ts tributary slots (ODTUk/Cn.ts).

11. The network element of claim 8, wherein a size of the channelized ODUflex is selected to match a size of one or more TSs associated with a High Order (HO) Optical channel Data Unit level k/Cn (ODUk/Cn) (k=1, 2, 3, 4), (n=1, 2, 3, . . . ).

12. The network element of claim 8, wherein the switching circuitry is configured to map the channelized ODUflex to a High Order (HO) Optical channel Data Unit level k (ODUk/Cn) (k=1, 2, 3, 4), (n=1, 2, 3, . . . ) using fixed (synchronous) Cm/CnD parameters or a Generic Mapping Procedure asynchronous mapping.

13. The network element of claim 8, further comprising:
a controller communicatively coupled to the plurality of ports and configured to manage the signal multiplexed into the channelized ODUflex via one or more of a management plane, a control plane, and a Software Defined Networking (SDN) controller.

14. The network element of claim 8, wherein the signal does not efficiently map to a TS of sizes 1.25G, 2.5G, and 5G.

15. An Optical Transport Network (OTN) network, comprising:
a plurality of nodes interconnected to one another,
wherein a channelized Optical channel Data Unit flexible (ODUflex) is configured between two nodes, wherein the channelized ODUflex supports a variable number of Tributary Slots (TSs) which is N, N is an integer, and a variable size of the TSs which is a rate of 100/N in Gb/s and the channelized ODUflex is a Low Order (LO) ODUflex, and wherein the channelized ODUflex is mapped into an Optical channel Transport Unit k/Cn (OTUk/Cn) (k=1, 2, 3, 4), (n=1, 2, 3, . . . ), wherein the channelized ODUflex carries a plurality of signals each in an associated TS of the variable number of TSs, and wherein the channelized ODUflex has a Payload Type which is based on the variable number of TSs and the variable size of the TSs.

16. The OTN network of claim 15, wherein the channelized ODUflex is multiplexed into an Optical channel Data Tributary Unit k/Cn with ts tributary slots, (ODTUk/Cn.ts) and the ODTUk/Cn.ts is mapped into the OTUk/Cn via an Optical channel Path Unit k/Cn (OPUk/Cn) and an Optical Data Unit k/Cn (ODUk/Cn).

17. The OTN network of claim 15, wherein the OTUk/Cn has two levels of TS multiplexing with a first level of TS multiplexing into the channelized ODUflex and a second level of TS multiplexing of the channelized ODUflex into an Optical channel Data Tributary Unit k/Cn with ts tributary slots (ODTUk/Cn.ts).

18. The OTN network of claim 15, wherein a size of the channelized ODUflex is selected to match a size of one or more TSs associated with a High Order (HO) Optical channel Data Unit level k/Cn (ODUk/Cn) (k=1, 2, 3, 4), (n=1, 2, 3, . . . ).

19. The OTN network of claim 15, wherein the channelized ODUflex is mapped to a High Order (HO) Optical channel Data Unit level k (ODUk/Cn) (k=1, 2, 3, 4), (n=1, 2, 3, . . . ) using fixed (synchronous) Cm/CnD parameters or a Generic Mapping Procedure asynchronous mapping.

20. The OTN network of claim 15, wherein a signal multiplexed into the channelized ODUflex is managed via one or more of a management plane, a control plane, and a Software Defined Networking (SDN) controller.

* * * * *